United States Patent [19]

Still et al.

[11] Patent Number: 4,572,046
[45] Date of Patent: Feb. 25, 1986

[54] PIVOT MOUNTED CUTTING KNIFE

[75] Inventors: Donald O. Still, Akron; Hubert T. Hovance, Ravenna, George J. Burley, Clinton, all of Ohio

[73] Assignee: The Firestone Tire & Rubber Company, Akron, Ohio

[21] Appl. No.: 493,088

[22] Filed: May 9, 1983

[51] Int. Cl.⁴ .............................................. B26D 7/10
[52] U.S. Cl. ...................................... 83/171; 83/554; 83/555; 83/614; 83/651
[58] Field of Search ................ 30/140, 309, 314, 315, 30/317, 353, 355–357; 83/16, 171, 554, 555, 651, 697, 614

[56] References Cited

U.S. PATENT DOCUMENTS

| D. 167,498 | 8/1952 | Dalianis | 30/355 X |
|---|---|---|---|
| D. 189,533 | 1/1961 | Bohlmann | 30/317 X |
| 245,150 | 8/1882 | Fowler | 30/357 X |
| 306,882 | 10/1884 | Watson | 30/353 X |
| 311,792 | 2/1885 | Stafford | 30/355 X |
| 1,509,927 | 9/1924 | Bowers | 30/353 X |
| 2,574,440 | 11/1951 | Smith et al. | 30/140 |
| 4,139,760 | 2/1979 | Banks | 30/140 X |

FOREIGN PATENT DOCUMENTS 121719  5/1948  Sweden ................. 30/355

Primary Examiner—James M. Meister
Attorney, Agent, or Firm—Ronald Brietkrenz

[57] ABSTRACT

A apparatus and method for applying a stabilizer ply to a tire building drum and more particularly a apparatus and method for cutting and applying the stabilizer ply material and specifically apparatus for cutting the stabilizer ply material between cords disposed therein and correcting for variations of the cord angles during the application process in order to provide an improved splice between the leading and trailing edges of the stabilizer ply material.

7 Claims, 39 Drawing Figures

C=0  D=0
AC=0-0=0
AD=(0)(2.0178)=0
PA=735
LC=0

C=+28  D=-28
AC=(+28)-(-28)=56
AD=(56)(2.0178)=113
PA=735+113=848
LC=0

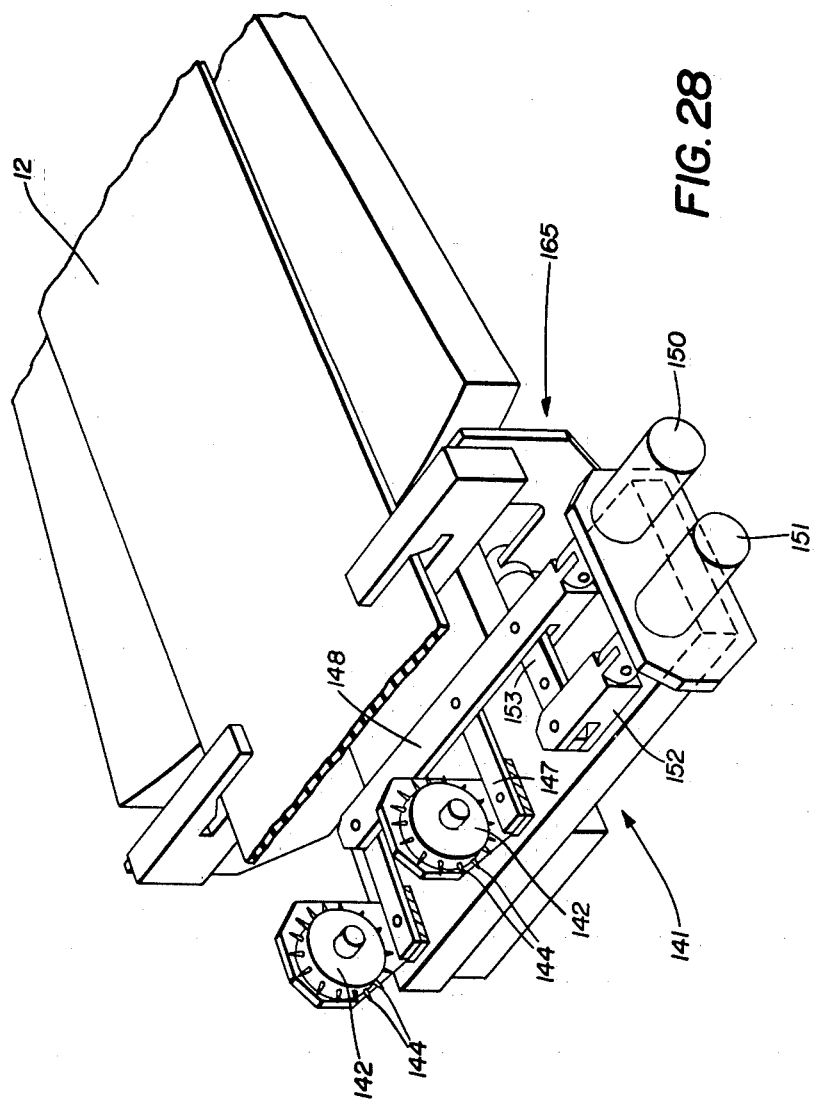

PIVOT MOUNTED CUTTING KNIFE

BACKGROUND OF THE INVENTION

1. Field of the Invention

This invention relates to a material application means and more particularly to a material application means adapted to apply stabilizer ply material having cords disposed at an angle therein to a tire building drum. Specifically, the instant invention relates to a transfer and application means used in conjunction with a cutter means to cut a pre-determined length of stabilizer ply material from a continuous roll of stabilizer ply material and apply said length to a tire building drum. The instant invention employs means for cutting the stabilizer ply material between the adjacent cords embedded therein and further has means for measuring of the angle of the cut so produced. The angled ends of the length of stabilizer ply material are adjusted during application to the tire building drum in order to cause the ends of said lengths to assume the same angle. A pair of wheels having pointed projections thereon are used to center the stabilizer ply material within the application means.

2. Description of the Prior Art

Means for material application are old in the art as evidenced by: U.S. Pat. No. 1,938,787 to Abbott which discloses a transfer drum having vacuum air circuits for ply attachment and means to cut the material along a helix. There is also disclosed a slight stretching of the ply material during the application process. U.S. Pat. No. 2,918,105 to Harris discloses a transfer drum having holes in the surface thereof through which suction may be applied to hold a severed band and transfer the same to a tire building drum. U.S. Pat. No. 3,071,179 to Tourtellotte et al discloses a tire apparatus utilizing a belt transfer mechanism. U.S. Pat. No. 3,100,731 to Brey discloses a mechanism for joining a leading edge of fabric cut on a bias to the trailing end. U.S. Pat. No. 3,157,542 to Trevaskis discloses a transfer drum and a cutter operative to cut a given length of ply. The edge of the severed length is pulled into alignment by means of the knife. U.S. Pat. No. 3,192,094 to Phillips et al discloses a means to sever ply material and a means to adjust the bias angle of the ply material. U.S. Pat. No. 3,591,439 to Leblond et al discloses a transfer drum and a cutter for the fabric on the drum. A centering device is provided for assuring alignment of the strip with respect to the drum. U.S. Pat. No. 3,595,724 to Leblond discloses the use of an applicator arm. U.S. Pat. No. 3,607,555 to Leblond, et al discloses a transfer drum and a breaker strip centering device. U.S. Pat. No. 3,654,828 to Leblond, et al discloses a transfer drum and aligning means, a cutter which cuts the ply on a helix and locating blocks which determine the length of the severed strip. U.S. Pat. No. 3,623,932 to Woodhall discloses the use of heated cutting knives. U.S. Pat. No. 3,732,767 to Habert discloses adjustable cutters, a drum, and a cutter movable along a helix. U.S. Pat. No. 3,803,965 to Alderfer discloses a vacuum pickup to pick up a severed strip and place it in a properly oriented position. U.S. Pat. No. 3,844,871 to Habert et al. discloses a breaker strip applicator means. U.S. Pat. No. 3,852,142 to Leblond et al discloses a transfer drum cutting means and a centering means. U.S. Pat. No. 3,899,383 to Schultz discloses a drum 4 applying a strip. U.S. Pat. No. 3,904,471 to Kubinski discloses a transfer drum and a means to cut the strip. U.S. Pat. No. 4,053,342 to Appleby discloses a vacuum manifold as well as the use of air pressure to release a tire band from the surface of the drum. U.S. Pat. No. 4,163,685 to Kubinski discloses a segmented drum. U.S. Pat. No. 4,170,509 to Kubinski discloses a drum made of segments and a single knife blade. Canadian Pat. No. 628,998 discloses the use of a vacuum clamp to hold the fabric and a photo cell control therefor. In addition, there is disclosed air employed as a flotation means to support the ply while it is moved and an aligning means to ensure that the ends of the fabric are properly aligned for joining. U.S. Pat. No. 3,130,100 to Hasselquist discloses an angular adjustment device that is utilized in order that fabric pieces bias cut at different bias angles can be butt splices. U.S. Pat. No. 3,676,259 to Appleby, et al., discloses a means for sensing the edge location of the ply and a device to move the supporting truck and surface drive as a unit to correct deviation from the desired edge location of the ply. U.S. Pat. No. 3,731,571 to Larson, discloses a pivoting guide to correct the irregularity of the strip being fed to a cutter.

The typical prior art procedure for cutting tire stabilizer plies having biased reinforcing cords therein and transferring same to a drum involves an operator utilizing a manual tire assembly machine. The operator typically pulls the leading edge of the stabilizer ply material from a server and affixes the leading end to a tire building drum. The tire building drum is then caused to be rotated by the operator. The tire stabilizer ply material is then wrapped about the tire building drum. The tire building drum is caused to make approximately one complete revolution after which its rotation is stopped. The operator then manually determines where the stabilizer ply material should be cut and then manually makes the cut of the stabilizer ply material along the axis of the cord members embedded therein in such a fashion as to cut the material between the cord members. The operator then manually manipulates the trailing edge of the stabilizer ply material in order to cause it to abut the leading edge of the stabilizer ply material. Often this requires considerable adjustment on the part of the operator since the angle of the cords at the leading edge of the stabilizer ply material may vary substantially from the angle of the cords in the trailing edge of the stabilizer ply material. After the operator has sufficiently adjusted by twisting and stretching the trailing edge of the stabilizer ply material, the two edges are abutted and stitched in order to form the stabilizer ply.

Many of the attempts to automate the stabilizer ply application process have focused on the cutting procedure. For example, U.S. Pat. No. 2,665,757 discloses a means to assure cutting between the cords by providing two knives with sharp points to penetrate the fabric and blunt edges to effect a tearing of the fabric between the cords by movement of the knives in opposite directions. However, the concept provided nothing to assure that the original vertical plunge of the sharp knives did not damage a cord. Furthermore, the action does not provide a clean-cut edge. In U.S. Pat. No. 3,641,855, a concept is disclosed whereby two knives sever the material near the center and move in opposite directions theoretically between the cords. The knives are hinged to provide somewhat of a novel motion in an attempt to avoid the cords. However, since one edge of each knife is fixed at the hinge, the preferred movement of parallelism to a cord is lost and contact with a cord, baring same, is highly likely. Finally, U.S. Pat. No. 3,789,712 discloses vibrating a knife blade in an attempt to avoid cords.

Another problem addressed by some attempts at automation relates to the adjustment of the knife angle for processing tire ply stock having differently biased reinforcing cords. U.S. Pat. No. 3,192,094, although relating to the construction of the roll of ply stock used for a tire server, attempts to solve the problem by altering the angle at which the material is fed to the cutting area. Such a complex procedure would not lend itself well to the system of cutting the ply stock supplied by a server and transfering same to a drum. U.S. Pat. No. 3,641,555 merely adjusts the angle at which a cut may be made but does not take into account the fact that all cords in the fabric, although at a nominal specified angle, are not always at the same angle. Therefore, if cuts are made between cords at various longitudinal locations along the fabric, the two cuts will not always be at the same angle.

In most attempts at automation, no satisfactory means has been developed to hold the fabric in place during cutting. Such is critical to a perfect cut, particularly when one is attempting to make a precise cut between reinforcing cords. Most attempts in this regard have used back-to-back knives moving in opposite directions to minimize materials shifting. Such is shown in U.S. Pat. No. 2,665,757; 3,641,855 and 3,762,259. However, even these disclosures recognize the imperfections in this concept in that the disclosure of U.S. Pat. No. 3,762,259 utilizes a mechanical clamp to assure that the fabric does not shift during cutting.

There is, therefore, a need for an apparatus which may be utilized to automatically sever a portion of stabilizer ply material having cords biased at an angle therein from a continuous roll of such material and apply same to a tire building drum wherein the leading edge of the stabilizer ply material and the trailing edge of the stabilizer ply material may be automatically aligned in order to produce an improved butt splice of the respective edges. Further, there is a need for a means adapted to sever a stabilizer ply material having cords biased at an angle therein in such a fashion as to cut the stabilizer ply between the cords in order not to bare any of the cords. The instant invention provides such means allowing for the precise application of stabilizer ply material to a tire building drum.

SUMMARY OF THE INVENTION

The present invention relates to a means and method for applying stabilizer ply material to a tire building drum and more particularly to a means and method for cutting and applying the stabilizer material in order to provide an acceptable splice between the trailing and leading edges of the stabilizer ply material.

BRIEF DESCRIPTION OF THE DRAWINGS

FIG. 28 is a perspective view showing the guiding means and edge detection means employed by the instant invention in their operative position.

DESCRIPTION OF AN EXEMPLARY EMBODIMENT

Figure 1:
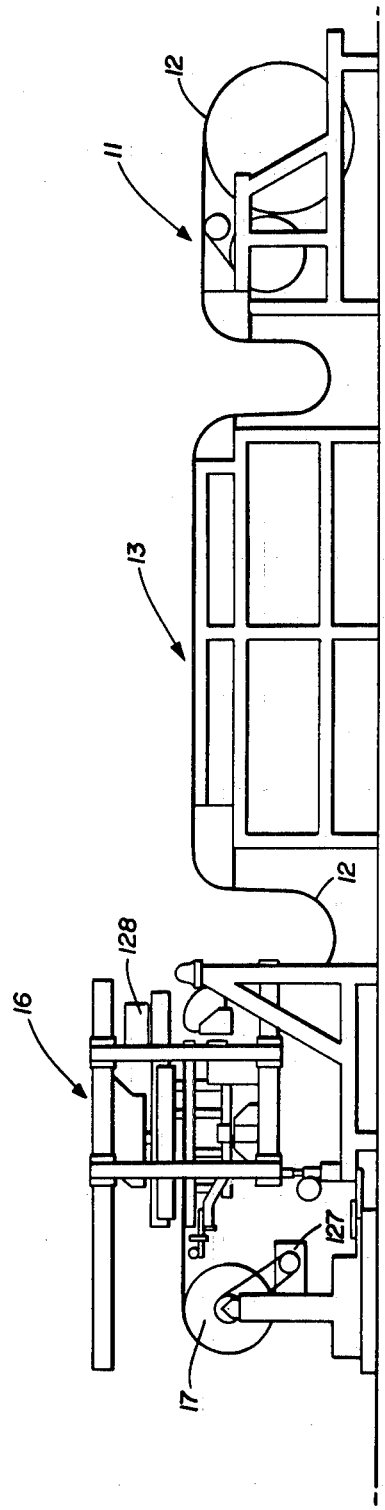
FIG. 1 is a side elevation of the stabilizer ply applicator embodying the instant invention.

Referring now to FIG. 1 of the drawings, there is disclosed the apparatus of the instant invention. Specifically, there is provided a server 11 having disposed therein a continuous roll of ply material 12. The ply material 12 is fed from the server 11 in a conventional manner to conveyor 13. The conveyor 13 is adapted to allow lengths of ply material from different rolls to be joined in order to form a continuous length of ply material. After passing over the conveyor 13, the ply material 12 is provided to ply applicator 16 which is adapted, as more fully described below, to sever a predetermined length of ply material from the continuous length and apply the severed portion of ply material to a tire building from indicated as 17. It should be appreciated that the conveyor 13 and the server 11 are conventional in structure and are well known to those skilled in the art. The operation at the instant invention is controlled by computer control 128.

In operation, the ply applicator 16 grasps the end of the ply material 12 and moves it to the top of the tire building drum 17 and presses the end of the ply material 12 to the top of the tire building drum 17, thus, causing the ply material 12 to adhere to the top of the tire building drum due to the tackiness of the ply material 12 and a series of vacuum orifices disposed in the tire building drum 17. The tire building drum 17 is then rotated in order to cause the ply material 12 to partially wrap around the tire building drum 17. After a sufficient portion of ply material 12 has been wrapped on the tire building drum 17, the ply material 12 is severed by a cutting mechanism contained within the ply applicator 16. The cutting mechanism contained within the ply applicator measures the angles of both the leading edge and the trailing edge of the severed piece of ply material 12. The ply applicator 16, in conjunction with rotation of the tire building drum 17, then causes the remainder of the cut piece of ply material 12 to be applied to the tire building drum 15 in such a manner that the leading edge of the severed piece of stabilizer material is in substantial contact with the trailing edge of the severed piece of ply material. Due to variances in the angle at which the ply material is cut, the angle of the leading edge at the ply material 12 often differs from the angle of the trailing edge at the ply material. In order to effectively join the leading and trailing edges at the ply material 12, it is necessary that the leading and trailing edges be disposed at substantially the same angle. The ply applicator causes the trailing edge to be rotated prior to application to the tire building drum in order to assume an angular orientation substantially the same as the leading edge. The severed piece of ply material is also slightly stretched by the ply applicator in order to correct the length at the severed portion in a manner disclosed in U.S. patent application Ser. No. 424,736 entitled "Length Correct Apparatus" and in the name of Kent K. Kipling, which application is hereby specifically incorporated by reference herein.

It can thus be seen that there are provided means for automatically dispensing from a continuous roll of ply material a length of said ply material suitable for applying to a tire building drum and means for applying said ply material to said tire building drum. The instant invention may be used in conjunction with an automated tire assembly system disclosed in U.S. patent application Ser. No. 386,373, now U.S. Pat. No. 4,443,290 entitled "Transfer Line" and filed in the name of Loeffler, et al., which application is specifically incorporated by reference herein.

Figure 2:
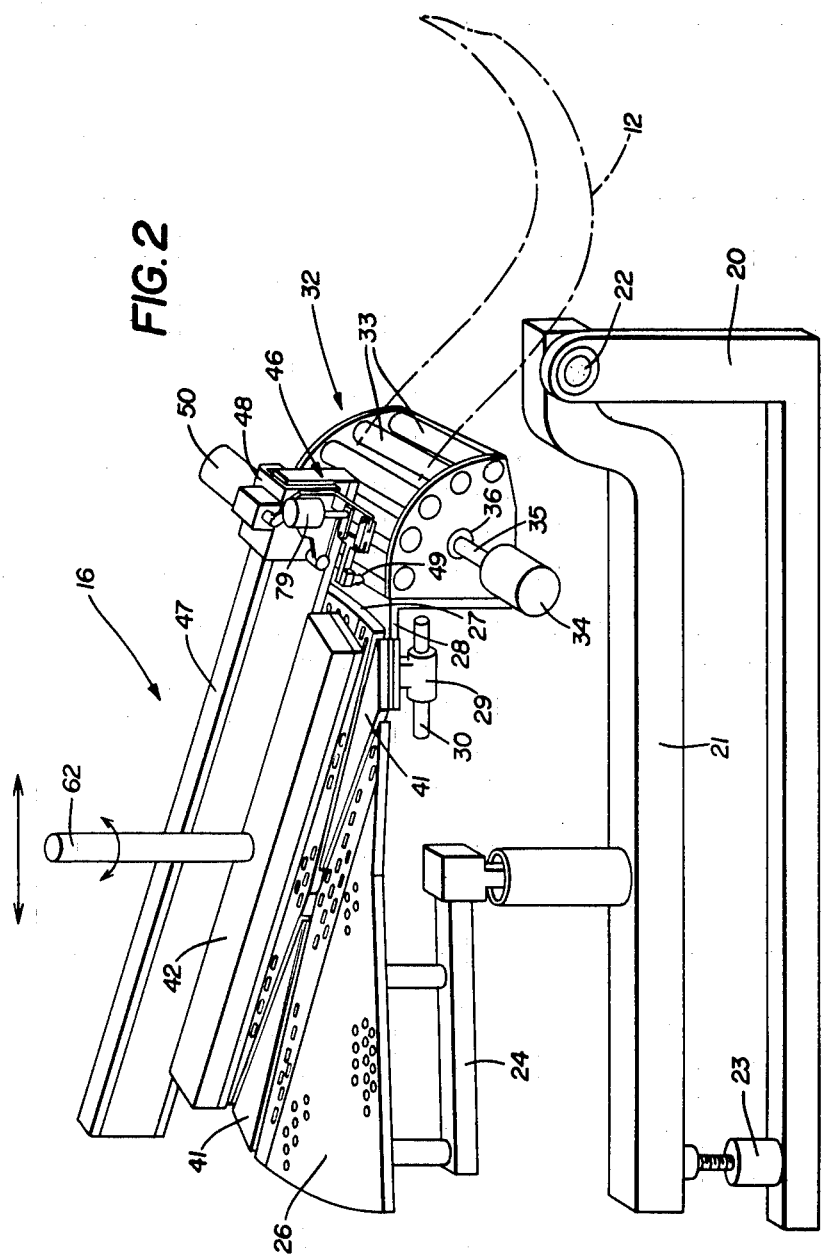
FIG. 2 is a simplified perspective drawing showing the main operative elements of the stabilizer ply applicator shown in FIG. 1.

Referring now to FIG. 2 of the drawings, there is shown a simplified schematic diagram showing the major operative elements of the ply applicator 16. The ply applicator 16 rests on base 20. Subframe 21 is supported upon the base 20 by means of pivot connections 22 and jackscrews 23. For reasons which will become more apparent below, the subframe 21 may be pivoted about the pivot connection 22 relative to the fixed base 20 by causing the jackscrews to either extend or contract by means of conventional mechanism.

Pivotally supported on the subframe 21 is table support 24 adapted to support front table 26. Associated with the front table 26 is rear table 27 which is pivotally mounted to mounting member 28. The front and rear tables 26, 27 have orifices in the surface thereof in order to provide a vacuum or source of purge air to the tables 26, 27. The mounting member 28 is fixedly attached to slide 29 which allows longitudinal movement of the slide 29 along its corresponding bearing surface 30 and hence provides a longitudinal movement of the rear table 27 with respect to the front table 26 for reasons more fully discussed below.

Fixedly attached to the mounting member 28 is roller assembly 32. The roller assembly 32 is comprised of a series of rollers 33 adapted to feed and guide the ply material 12 from the conveyor 13 to the rear table 27. The roller assembly 32 may be laterally displaced with respect to the rear table 27 by means of stepper motor 34 acting in conjunction with drive screw 35 which in turn engages drive nut 36 which is fixedly attached to the roller assembly 32.

Disposed between the front table 26 and the rear table 27 are wedge members 41 that are movable from a position wherein the top surface of the wedge members 41 is substantially even with the top surfaces of the front and rear tables 26 and 27 to a position where the top surface of the wedge members 41 are substantially below the top surfaces of the front and rear tables.

Disposed above the front table 26 and substantially parallel to the space between the front and rear tables is manifold 42. The manifold 42 may be moved along the longitudinal axis of the ply applicator 16 as generally shown by the arrows. In addition, the manifold 42 may be rotated about its central axis also as shown in the drawing. Disposed along the bottom of the manifold 42 is a silicone rubber surface having generally oblong orifices therein which are in communication with a source of vacuum or alternatively may be connected to a source of purge air.

Disposed beside and substantially parallel to the manifold 42 is knife assembly 46. The knife assembly 46 is mounted on subframe 21 and is comprised of support rail 47 upon which is carried knife transport 48. The knife transport 48 enables the cutting edge of the knife 49 to be raised or lowered relative to the plane of the front and rear tables 26, 27. Rotary encoder 50 is provided in order to measure the angular displacement of the knife 49. A stepper motor 50 is adapted to move and measure the displacement of the knife 49 along the support rail 47.

Referring now to FIGS. 3 through 10 of the drawings, there is disclosed a schematic representation of the instant invention adapted to disclose the sequence of operations of the instant invention. It should be noted that FIGS. 3A through 10A are plain view of the apparatus in FIG. 2 and FIGS. 3B through 10B are front views of the device disclosed in FIG. 2 of the drawings.

Figure 3A:
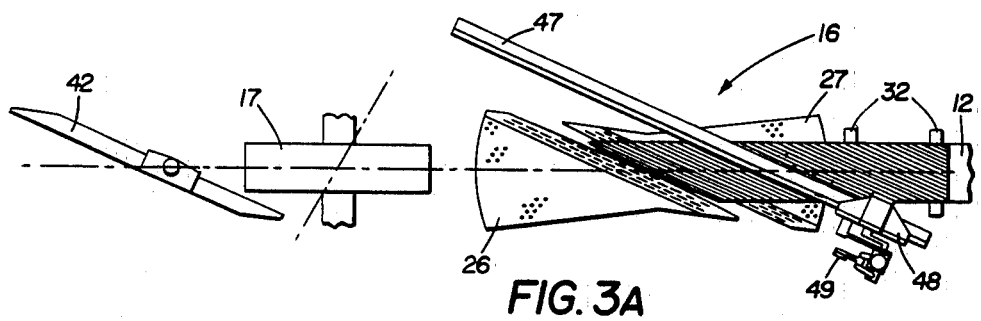
FIGS. 3A through 10B are simplified schematic drawings illustrating the sequence of operation of the stabilizer ply applicator.
Figure 3B:
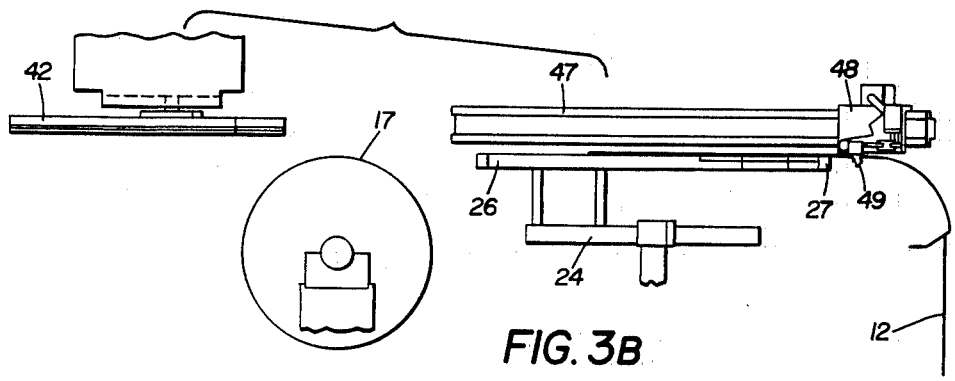

Referring now to FIGS. 3A and 3B of the drawings, there is disclosed the ply applicator 16 having a front table 26 and a rear table 27 disposed beneath knife support rail 47 having slidably engaged therewith knife transport 48 which carries the knife 49. The roller assembly 32 is schematically represented by rollers designated with the numeral 32. Proximate to the ply applicator 16 is tire building drum 17 to which the ply material 12 is applied. As shown in FIGS. 3A and 3B of the drawing, the manifold 42 has been displaced to its most forward and upward position. The leading edge of the ply material 12 has been previously severed during the previous operation leaving the cut edge substantially between the space between the front table 26 and the rear table 27. During the cutting of this leading edge the angle of the cut made by the knife 49 was recorded for later use during the processing of the ply material 12. It should also be noted that the knife transport 48 and its associated knife assembly 46 are in what is considered to be the home position, that is a position furthest from the tire building drum 17.

Figure 4A:
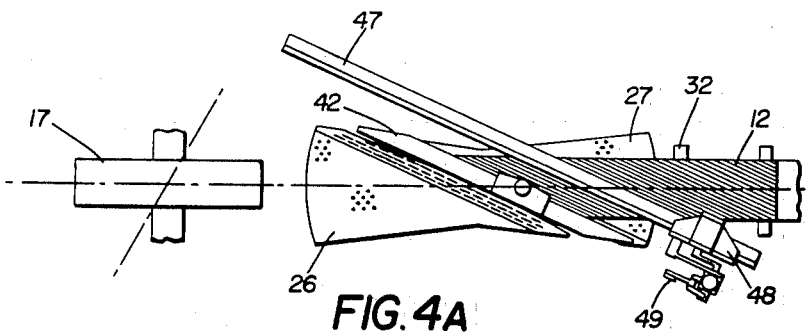
Figure 4B:
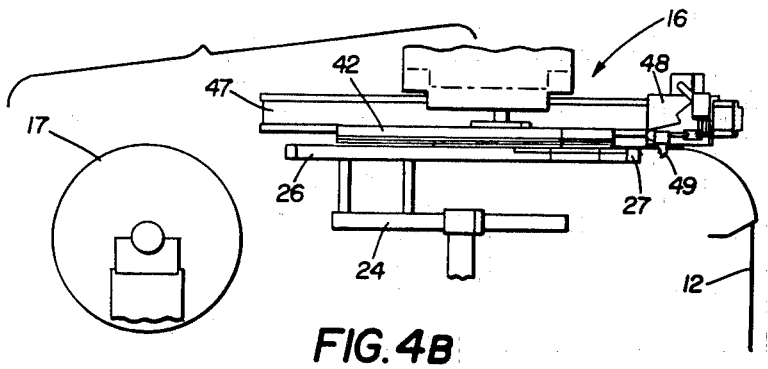

The manifold 42 is then rotated by a means more fully described below to an angle corresponding to the leading edge of the ply material 12. The manifold is then caused to move towards the cut edge of the ply material 12 to a position where the manifold 42 is placed over the leading edge of the ply material 12 and subsequently lowered to a position substantially contacting the leading edge of the ply material 12 as shown in FIGS. 4A and 4B of the drawings. A vacuum is then applied to the manifold 42 and purge air is provided to the manifolds in the rear table 27 causing the leading edge of the ply material 12 to be transferred from a position resting on the rear table 27 to an engaging position on the manifold 42 by virtue of the vacuum applied to the manifold 42.

As shown in FIGS. 4A and 4B of the drawing, the manifold 42 is then caused to be driven towards the tire building drum 17. While the manifold 42 is traversing towards the tire building drum 17, the tire building drum 17 is rotated in order to position a vacuum area 160 (see FIG. 27) located in the tire building drum 17 to a position where it may receive the end of the leading edge of the ply material 12.

Figure 5A:
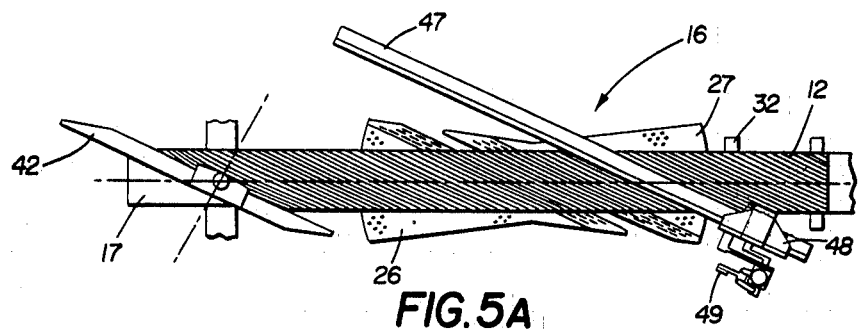
Figure 5B:
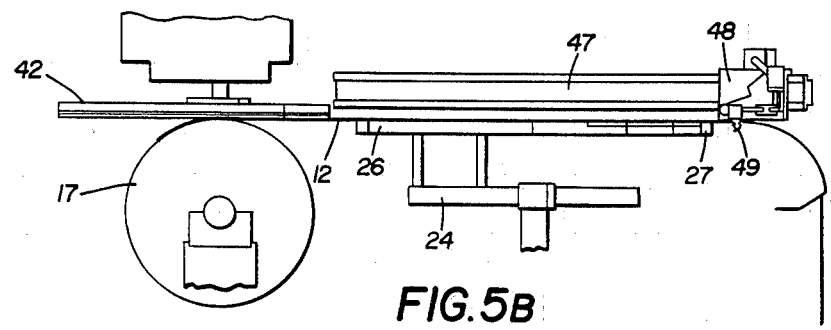

Referring now to FIGS. 5A and 5B of the drawings, it may be appreciated that as the manifold 42 approaches the tire building drum 17 the tip of the leading edge of the ply material 12 is caused to be transferred from the manifold 42 by causing a vacuum to be applied to a small portion of the tire building drum while simultaneously causing purge air to be applied to a first chamber of the manifold 42 corresponding to this portion of the leading edge of the ply material 12 in order to cause this portion of the leading edge of the ply material 12 to be transferred from the manifold 42 to the tire building drum 17. During application the manifold 42 is substantially tangent to the surface of the tire building drum 17. It should be noted that the manifold 42 tracks the rotation of the tire building drum as it transfers the ply material 12 from the manifold 42 to the tire building drum 17. Tracking is the matching of the manifold speed to the surface speed of the drum. This is accomplished by utilizing a stepping motor 127 (See FIG. 1) that drives the tire building drum and provides an output indicative of angular position. The output indicative of angular position is then utilized to control the forward movement of the manifold 42 and the tire building drum rotation so that the surface speed at the drum and the forward speed of the manifold are identical.

Figure 6A:
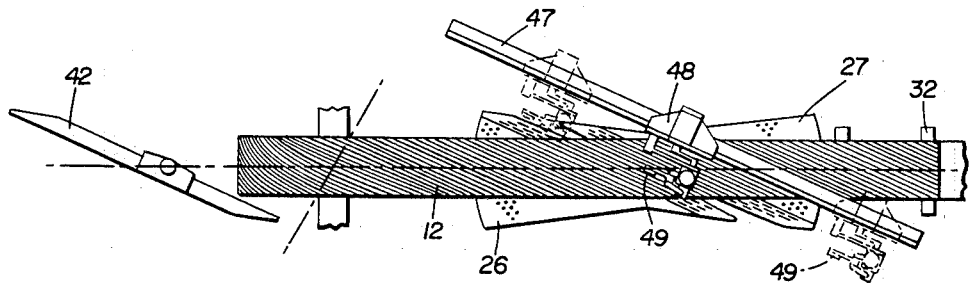
Figure 6B:
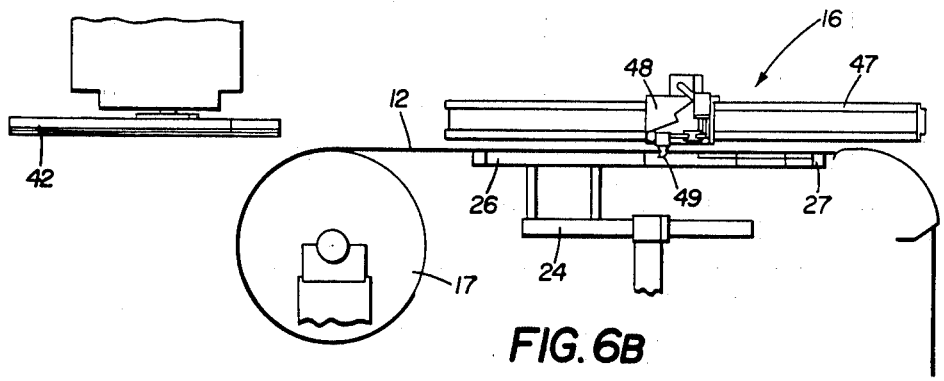

Referring now to FIGS. 6A and 6B of the drawings, it can be appreciated that the leading edge of the ply material 12 has been fully transferred from the manifold 42 to the tire building drum 17 and that the tire building drum 17 has been rotated in order to cause the ply material 12 to be wrapped around a significant portion of the tire building drum 17. While the ply material 12 has been partially wrapped about the tire building drum 17, the knife assembly 46 is simultaneously caused to move to a position along the support rail 47 corresponding to a position at the center of the ply material 12. The manifolds of the front and rear tables have a vacuum applied there to in order to cause the ply material 12 to be retained by the vacuum manifolds on the front and rear tables 26 and 27. The knife 49 is then caused to plunge downward and driven forward through the edge of the ply material 12 to a position towards the tire building drum 17 past the edge of the ply material 12, thus partially severing the ply material 12. The knife is then caused to pivot upward and is returned to the exact center of the ply material 12 where the knife is again caused to plunge downward through the center of the ply material 12 and is driven to the home position past the edge of the ply material 12 thus completely severing the ply material 12. During both the forward cut and the home cut of the ply material 12 the angular deviation of the knife 49 with respect to knife rail 47 is measured in order to provide an output indicative of the angle of the cut of the ply material 12.

Figure 7A:
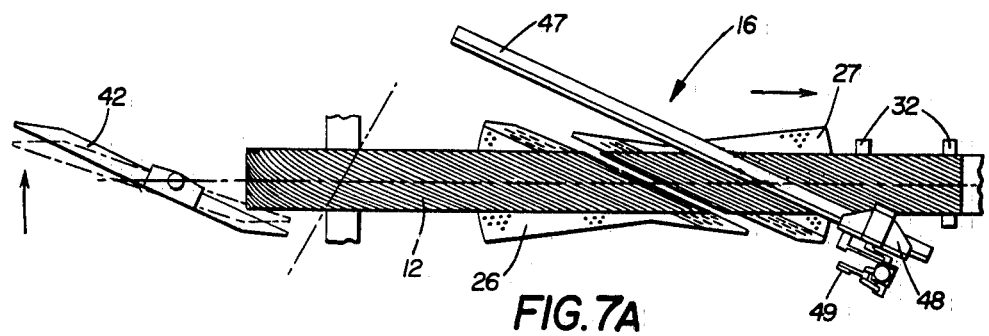
Figure 7B:
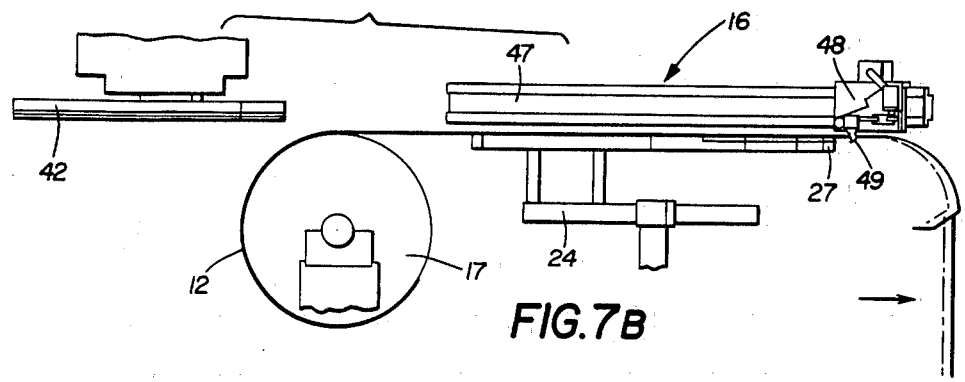

As shown in FIGS. 7A and 7B of the drawings, the rear table 27 is caused to move away from the tire building drum 17 to cause a complete separation between the trailing edge of the ply material 12 being applied to the tire building drum 17 and the leading edge of the ply material 12 being provided to the ply applicator 16. Simultaneously the manifold 42 is caused to be rotated to assume an angle equal to the angle of the cut just produced by the knife assembly 46.

Figure 8A:
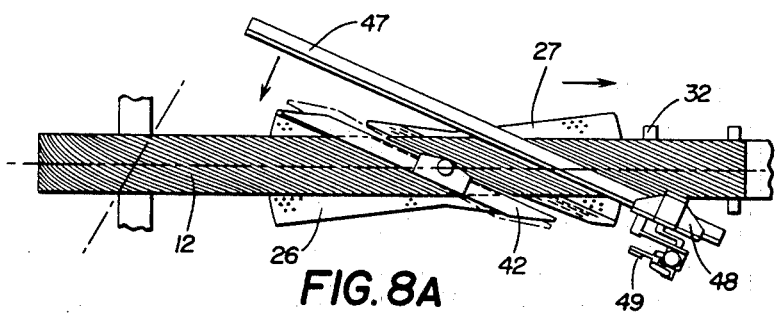
Figure 8B:
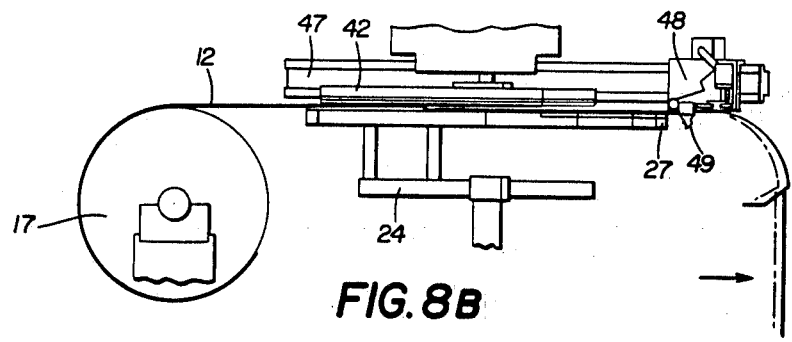
Figure 9A:
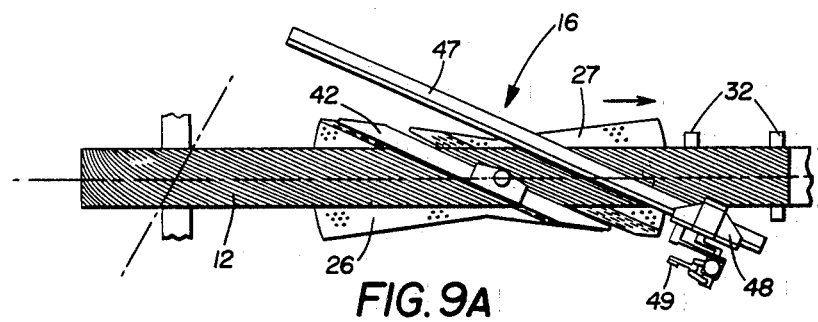
Figure 9B:
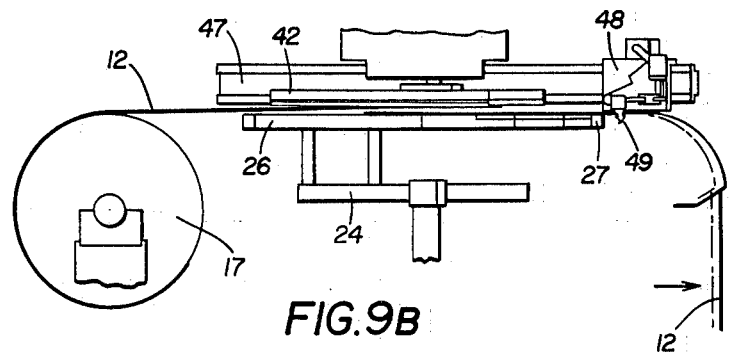

Referring now to FIGS. 8A and 8B of the drawing, the manifold 42 is shown in its retracted position over the trailing edge of the ply material 12 and further having picked up the trailing edge of the ply material 12 by applying vacuum to the manifold 42. The manifold 42 is then rotated to the angle of the leading edge of the ply material 12 in order to provide an improved splice between the leading and trailing edges of the ply material 12. As shown in FIGS. 9A and 9B, the cut ply material 12 is then stretched by the manifold 42 in order to correct for the proper length in order that the leading and trailing edges will properly abut each other.

Figure 10A:
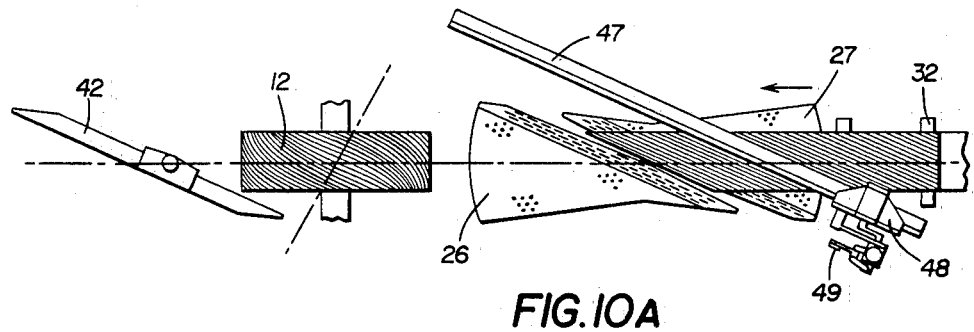
Figure 10B:
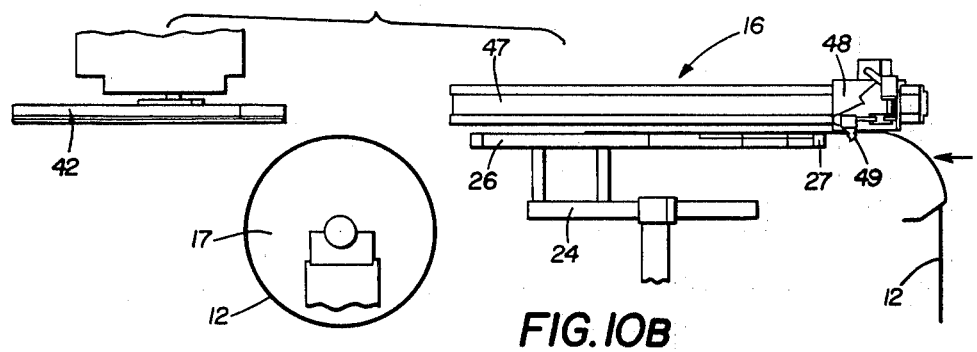

FIGS. 10A and 10B show the ply material 12 completely applied to the tire building drum 17. After the tire building drum 17 having the ply material applied thereto is removed from this station and another tire building drum requiring ply material applied thereto is provided to this station, the cycle of cutting and applying the ply material 12 to the tire building drum 17 may be continued.

Figure 11:
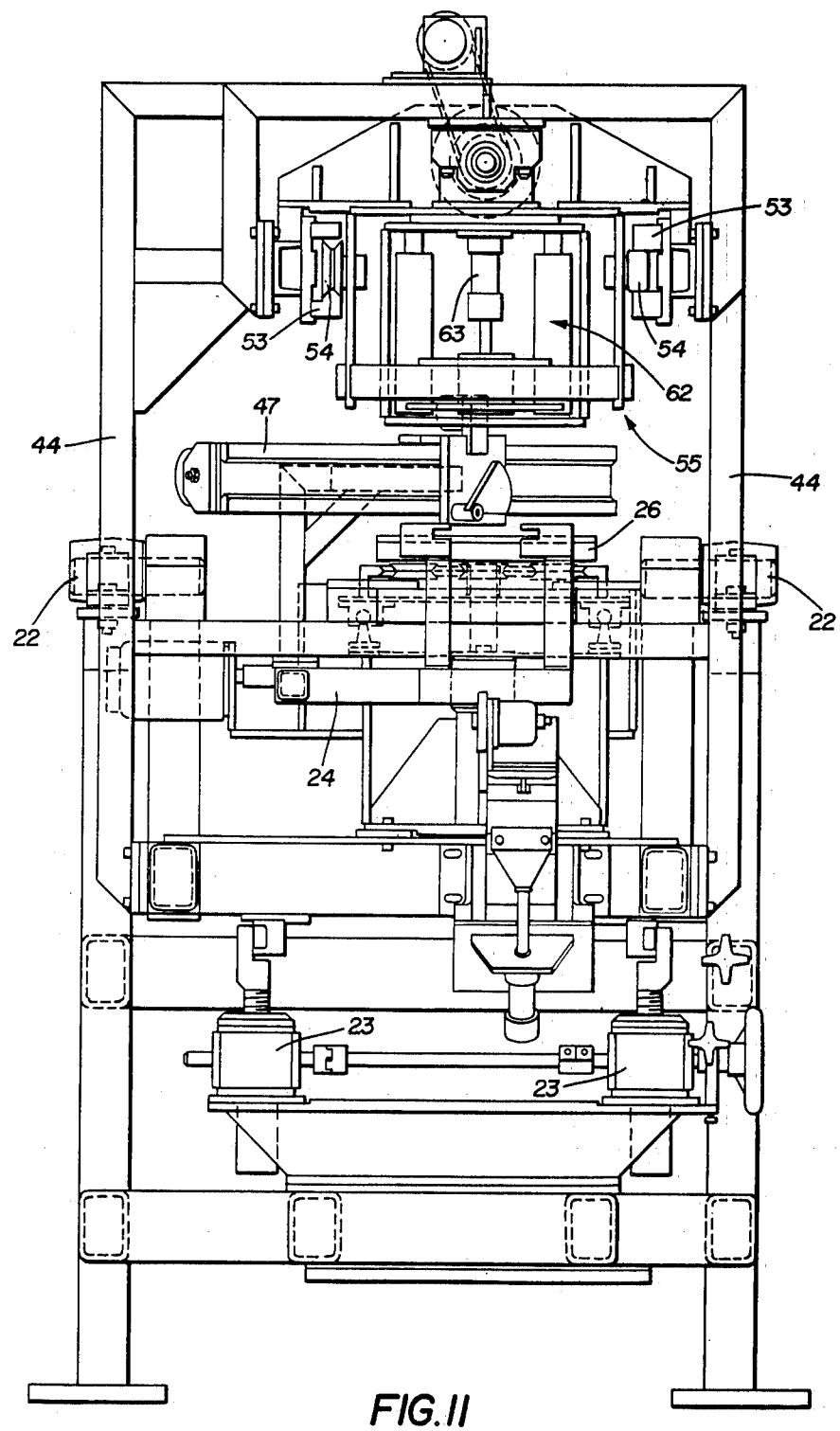
FIG. 11 is a front view of the ply applicator employed by the instant invention.
Figure 12A:
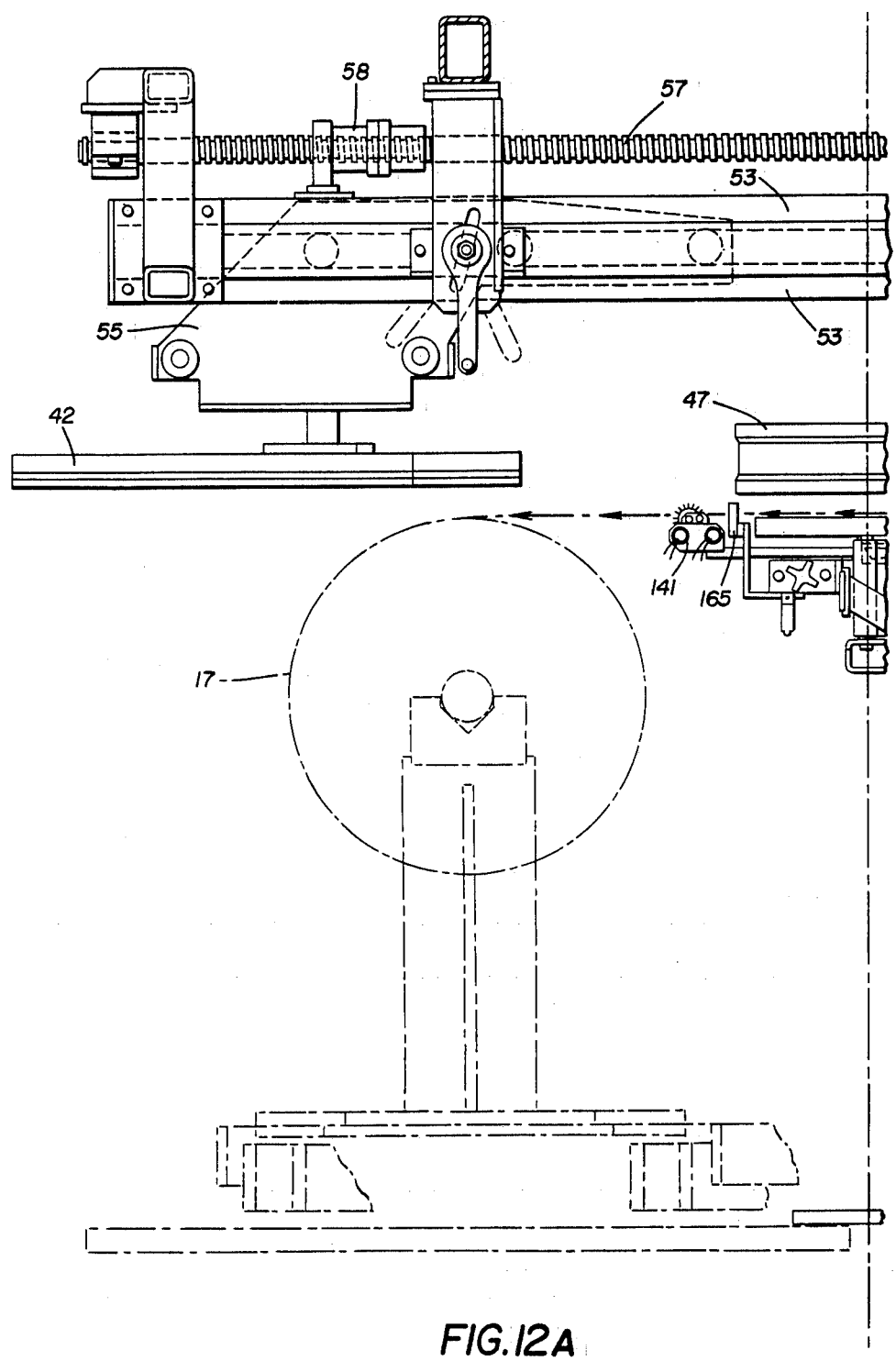
FIGS. 12A and 12B is a left side view of the ply applicator disclosed in FIG. 11.
Figure 12B:
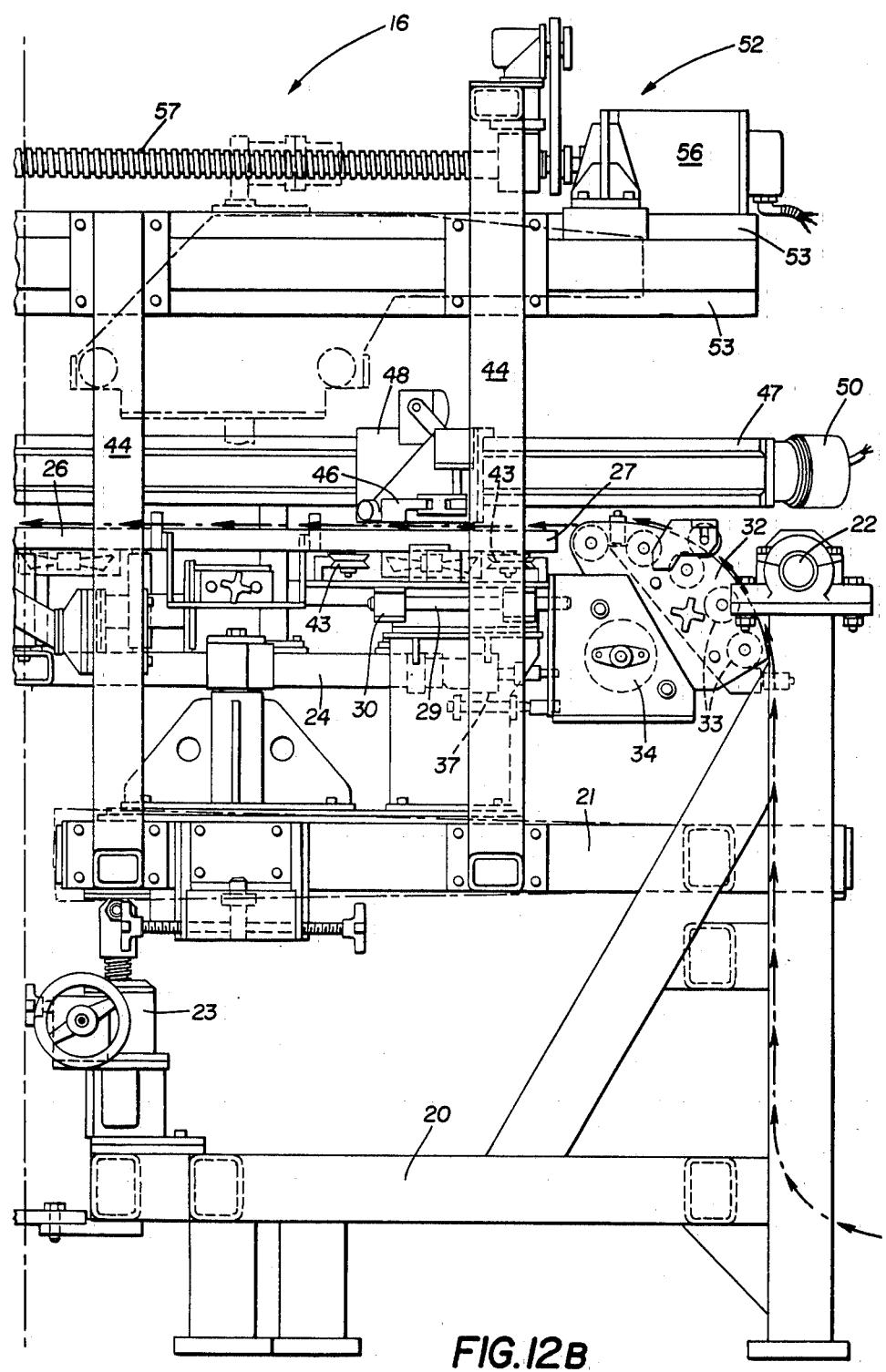

Referring now to FIGS. 11 and 12 of the drawings, there are shown further details of construction of the ply applicator 16 shown in a front view in FIG. 11 and in a side view in FIG. 12. The ply applicator 16 includes a base 20 having mounted thereon subframe 21. The subframe 21 is mounted upon the base 20 by means of pivot connections 22 and jack screws 23. It may be appreciated that the subframe 21 and the components resting thereon may be pivoted about the pivot connections 22 by means of jack screws 23. The pivoting of the subframe 21 about the pivot connections 22 allows the end of the ply applicator 16 to be raised or lowered in order to accommodate various size tire building drums 17.

Disposed on the subframe 21 is table support 24 which is adapted to be pivotally supported by the subframe 21. Mounted on the table support 24 is front table 26. It should be noted that the front and rear tables 26 and 27 may be rotated relative to the subframe 21 by means of roller members 43 which are adapted to allow the rear table 27 and table support 24 which allows front table 26 to be rotated with respect to the subframe 21 for reasons which will be discussed below. In the exemplary embodiment the tables 26 and 27 are rotated such that the space between them assumes the nominal angle at the cords in the ply material 12. Mounted behind the rear table 27 is roller assembly 32 having a series of rollers 33 mounted thereon and adapted to transport the ply material 12 from the conveyor 13 to the rear table 27. The roller assembly 32 is longitudinally movable with respect to the front table 26 by virtue of linear bearing 30 coacting with slide 29 to allow the roller assembly 32 to be displayed along the longitudinal axis of the ply applicator 16 by means of actuation of air cylinder 37. In addition to moving along the longitudinal axis of the ply applicator 16, the roller assembly 32 may also be displaced along the lateral axis of the ply applicator 16 by means of stepper motor 34 (not shown) and its associated drive screw and drive nuts. The stepper motor 34 is controlled by photocells adapted to detect the edge of the ply material 12 in order to provide a means for centering the ply material 12 within the ply applicator 16.

Disposed above the rear table 27 is knife support rail 47 having associated therewith knife transport 48 which carries knife assembly 46 having thereon knife 49. The support rail 47 is disposed at an angle equal to the nominal angle at the cords disposed within the ply material 12. The knife transport 48 is adapted to be slidably movable along the support rail 47 by means of a stepper motor 50 which engages a chain drive mechanism which is adapted to move the knife transport 48 along the support rail 47 in response to commands provided by the stepper motor 50. The control commands provided to the stepper motor 50 also provide a means of determining the location of the knife transport 48 with respect to the support rail 47.

Disposed on the subframe 21 are four support members 44. The support members 44 are adapted to hold rail assembly 52 in a fixed position with respect to the subframe 21. Mounted on the support members 44 are rail members 53 which are adapted to receive roller members 54. Associated with the roller members and supported by said roller members is carriage assembly 55. The carriage assembly 55 is adapted to be transported along the rail members 53 on said roller members 54 by means of stepper motor 56 rotating ball screw 57 and engaging nut 58 fixedly attached to the carriage 55. It may now be appreciated that by selective actuation of the stepper motor 56 and the subsequent rotation of ball screw 57, the carriage 55 may be selectively moved along the rail members 53. Associated with the carriage 55 is lift mechanism 62 which is comprised of an air cylinder 63 having one end thereof affixed to the upper portion of the carriage 55 and the other end thereof affixed to a lower portion slidable with respect to the carriage 55 in a vertical direction. Affixed to the lift mechanism 62 is manifold 42 which is utilized in the manner described above.

Figure 13:
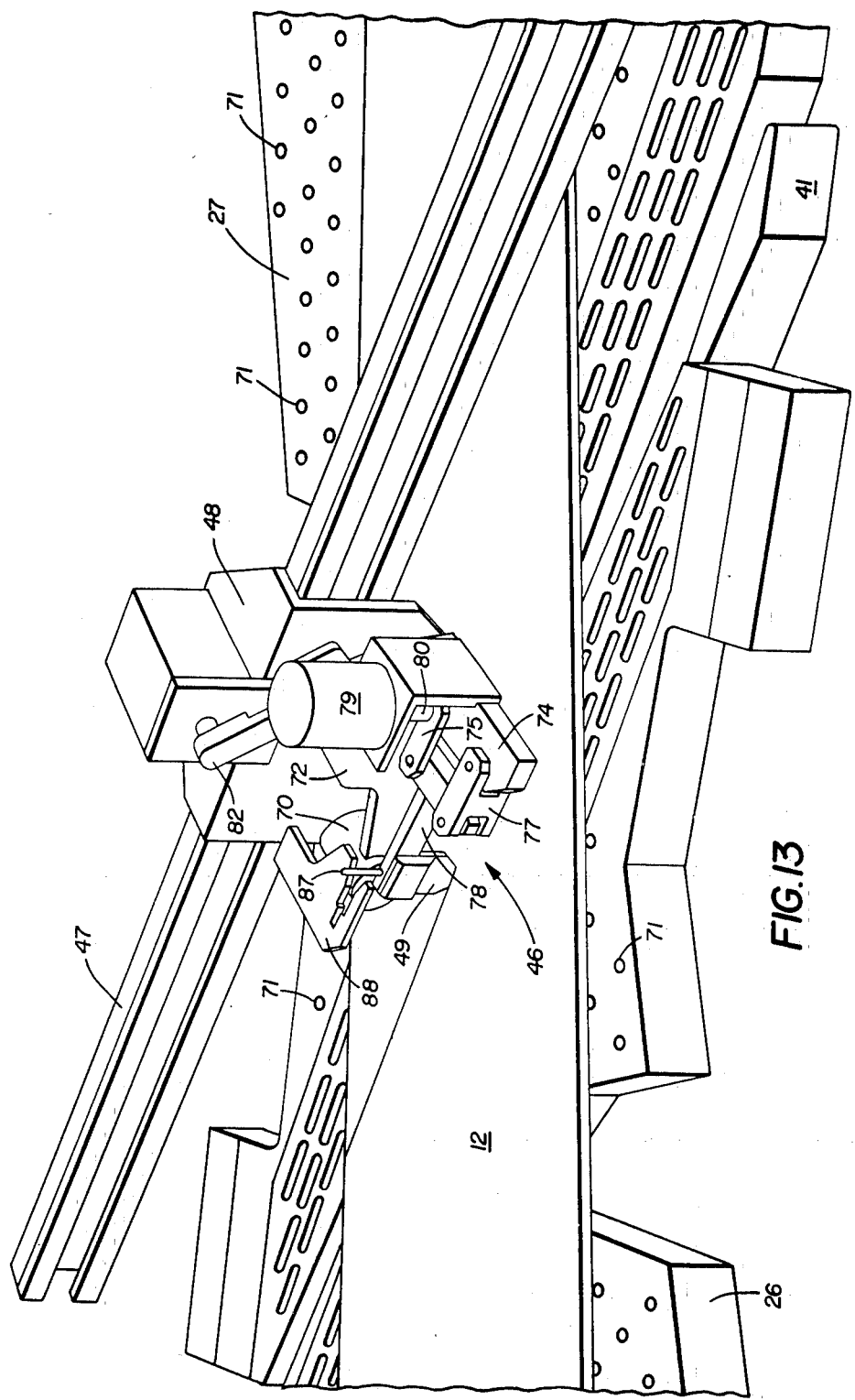
FIG. 13 is a detailed perspective view of the cutting means employed by the instant invention.

Referring now to FIG. 13 of the drawings, there are shown further details of construction of the front table 26 and the rear table 27 disclosed in FIG. 2 of the drawings. Specifically, it should be noted that each of the front and rear tables comprise a manifold section proximate to the common edge thereof having generally elongated holes therein which are connected to a common orifice within the front and rear tables to form a manifold means proximate to the common edge of the front table 26 and the rear table 27. The orifices within the front and rear tables may be selectively connected to either a source of vacuum or a source of purge air in order to provide a means for alternatively causing the ply material 12 to be gripped by the table upon connection of the orifices within the front and rear tables to a vacuum source or alternatively cause the ply material 12 to float above the front and rear tables by providing a source of purge air to the orifices within the front and rear tables 26, 27.

These portions of the front and rear tables are made of silicone rubber in order to reduce the tendency of the ply material to stick thereto. It should also be noted that the remainder of the surface of the front and rear tables 26, 27 are provided with air holes 71 through which air is forced by fans located beneath the air tables as shown in FIG. 12 of the drawings. The flow of air through the air hole 71 causes the ply material 12 to float on the layer of air so provided and is thus more easily transported over the front and rear tables. This portion of the front and rear air tables is made of steel.

There are also provided wedge members 41 which are adapted to be raised or lowered by an air cylinder means. The wedges 41 are utilized in a manner discussed more fully below to provide support to the ply material 12 during manifold pick up while on occasion allowing the ply material 12 to be readily cut by the knife assembly 46. The wedge members 41 are generally formed as an elongated triangle to substantially fill the space provided between the common edges of the front and rear tables 26, 27.

More fully disclosed in FIGS. 13-17 of the drawing is the knife assembly 46 utilized by the instant invention to sever the ply material 12. The knife assembly 46 includes support rail 47 upon which knife transport 48 is caused to move by a chain drive means disclosed above. The knife assembly means includes knife mounting member 72 which is adapted to be pivoted around pivot mount 70, as more fully disclosed in FIG. 14 of the drawings. Fixedly attached to the knife mounting member 72 and rotatable therewith is mounting link 74. Pivotally affixed to mounting link 74 are pivoting links 75 and 77. The pivoting links 75 and 77 are adapted to have one end thereof pivotally mounted in a fixed spaced relationship on the mounting link 74. The opposite end of each of the pivoting links 75 and 77 is pivotally affixed to the knife link 78. The knife link 78 is generally T-shaped in configuration with one end of each of the pivoting links 75 and 77 pivotally affixed to one end of the top of the T. It may now be appreciated that there is provided a four bar linkage member comprised of mounting link 74, pivoting links 75 and 77 and knife link 78. The pivoting links 75 and 77 are nonparallel in the exemplary embodiment. It may be readily appreciated that the knife link 78 may be displaced relative to the mounting link 74 and that any such displacement will be a combination of angular displacement with respect to the mounting link 74 and linear translation also with respect to the mounting link 74.

Affixed to the mounting link 74 is rotary encoder 79 whose input shaft 80 is fixedly attached to pivoting link 75 in order to provide an output indicative of the angular displacement of the pivoting link 75 with respect to the mounting link 74. Further, the output of the rotary encoder 79 is also indicative of the angular and translational displacement of the knife link 78.

Figure 14:
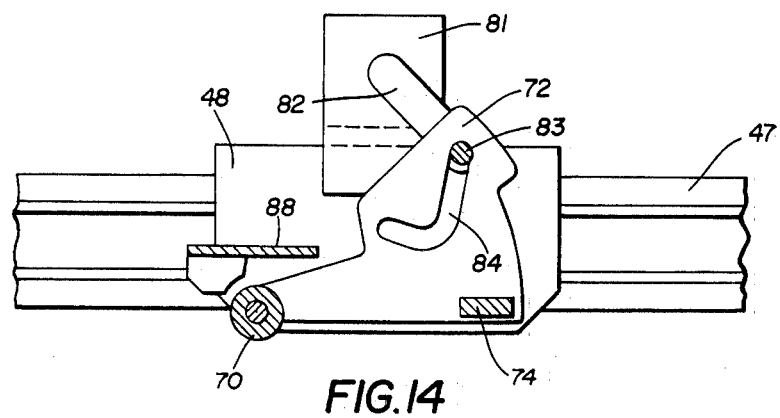
FIG. 14 is a front view of the cutting means employed by the instant invention having portions thereof broken away to more fully disclose the details of construction thereof.
Figure 15:
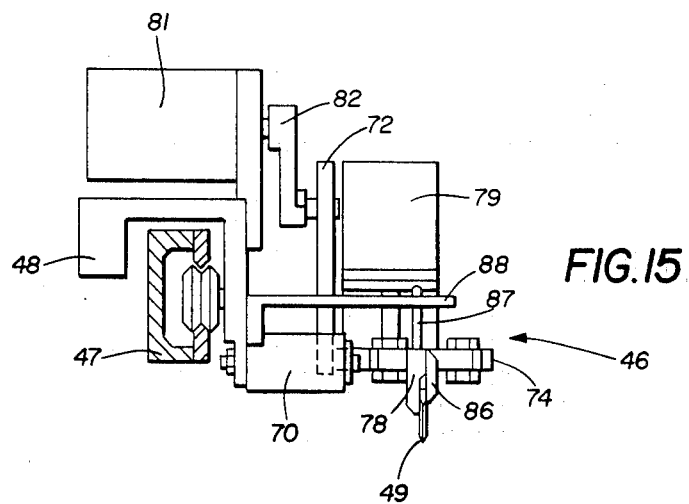
FIG. 15 is an end view of the cutting means employed by the instant invention.
Figure 16:
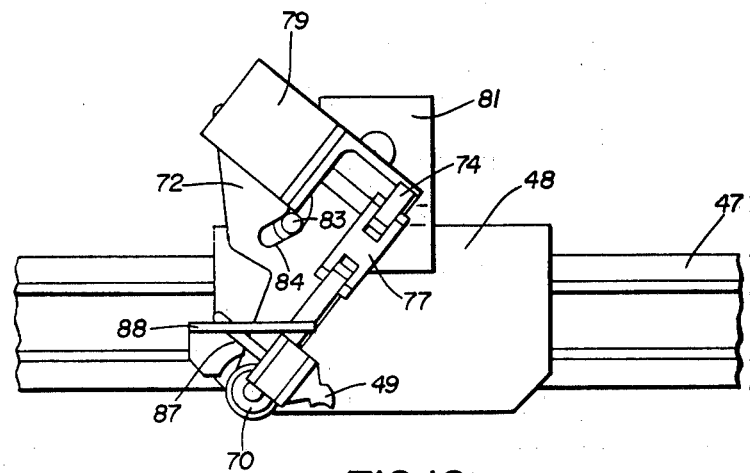
FIG. 16 is a front elevation of the cutting means employed by the instant invention shown in its uppermost position.
Figure 17:
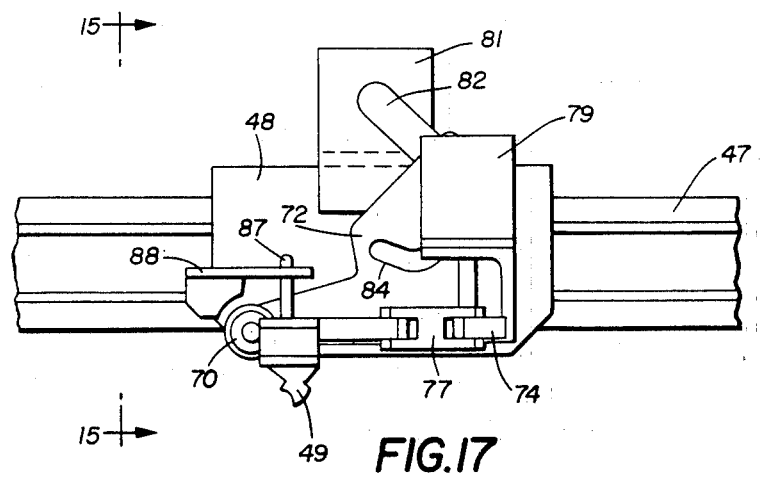
FIG. 17 is a front elevation of the cutting means employed by the instant invention showing the cutting means in its operative cutting position.

As disclosed most clearly in FIG. 14 of the drawings, the knife mounting member and the mounting link 74 may be pivoted about pivot 70. The pivoting movement of the knife mounting member 72 about pivot 70 may be effected by rotary actuator 81 imparting an angular movement to arm 82 which has on the end thereof rod member 83. The rod member 83 is adapted to fit within slot 84 in the knife mounting member 72. It should be noted that the slot 84 in the knife mounting member 72 in which the rod member 83 of arm 82 is located has both a straight and curvilinear portion and is specifically adapted to cause two rates of angular movement of the knife mounting member 72 with respect to the support rail 47. Specifically, the upper portion of the slot 84 is at a relatively large angle with respect to the axis of the support rail 47. It may be readily appreciated by one skilled in the art that a given angular movement of the arm 82 by rotary actuator 81 will cause a relatively small angular displacement of the knife mounting member with respect to the support rail 47. Similarly it should be noted that the lower portion of the slot 84 is at a rather small angle with respect to the axis of the support rail 47, thereby providing a much greater rate of angular displacement for a given displacement of the arm 82 by the rotary actuator 81.

Thus it may be observed that there are two distinct rates of angular displacement of the knife mounting member 72 with respect to the support rail 47. Namely, the knife mounting member 72 will be displaced from its initial position as shown in FIG. 14 at a relatively small angular velocity until the rod member 83 reaches the portion of the slot 84 having a relatively small angle with respect to the axis 47 whereupon the angular displacement of the knife mounting member 72 with respect to the support rail 47 will substantially increase. Conversely as the knife mounting member 72 is angularly displaced from its upward position towards its initial position as shown in FIG. 14 of the drawings, the angular displacement will be relatively large as long as the rod member 43 is in that portion of the slot 84 having a relatively large angle with respect to the support rail 47. However, when the rod member 83 reaches that portion of the slot 84 having a relatively small angle with respect to the support rail 47, the angular displacement of the knife mounting member 72 with respect to the support rail 47 will substantially decrease allowing the knife assembly to be gradually lowered to its initial or cutting position as shown in FIG. 14 of the drawing.

Fixedly attached to the knife transport 48 is bracket 88 having a generally triangular shaped slot therein adapted to receive knife guide 87 which is affixed to the end of the knife link 78. Also affixed to this end of the knife link 78 is knife mounting bracket 86 which is used to mount knife 49 to the end of the knife link 78. As more clearly shown in FIGS. 16 and 17 of the drawings, it may be appreciated that the knife guide 87 is used in conjunction with the triangular slot in bracket 88 in order to provide a guiding function of the knife 49. Specifically, when the knife 49 is in its uppermost position a disclosed by FIG. 16 of the drawings, the knife guide 87 is displaced towards the apex of the triangular slot within the bracket 88 causing the knife 49 to be centered within its travel range provided by links 74, 75, 77 and 78. It can also be appreciated that as the knife 49 is lowered, the relationship of the rod member 83 with respect to the slot 84 of the knife guide 87 will cause the knife guide 87 to be allowed to be displaced with respect to the triangular slot in the bracket 88 until the knife 49 reaches its downward most position wherein the knife 49 may be relatively displaced due to the relationship of the knife guide 87 with respect to the base of the triangular opening within the bracket 88.

There is thus provided a means for causing the knife 49 to be centered when in its uppermost position while allowing the knife 49 to be displaced relative to the support rail 47 in its downward most position for reasons which will be more fully disclosed below. In the exemplary embodiment the knife 49 is heated by a resistance heating element mounted on the knife 49 to a temperature of approximately 375° F.

There has thus been disclosed a knife transport means 48 adapted to be displaced along a support rail 47 having a pivoting knife mounted thereon so as to allow upward movement of the knife 49 with respect to the front and rear tables 26, 27. It may thus be appreciated that there is provided a means for causing the knife assembly 46 to be transported to the center of the ply material 12. There is also provided means for causing the knife 49 to be plunged in the ply material 12 and linearly displaced to cause a cutting of the ply material 12. It should further be appreciated that the angle of cut of the ply material 12 may be measured by using the output of the rotary encoder 70 which provides an output of the angular orientation of knife link 78 which in turn is a function of the angle of cut of the ply material 12.

Referring now to FIGS. 18 through 23, there are disclosed further details of the angle correction method employed by the instant invention. As discussed above, the ply material 12 applied to the tire building drum has a series of cords disposed in the generally elastomeric material. The angle of the cords with respect to the longitudinal axis of the ply material is generally designated as a nominal angle, for instance, 73°. However, during the manufacturing process of the ply material 12, the angle of the cords within the ply material may vary substantially, i.e., 2°–3° from the nominally stated angle. As more fully discussed above, in order to provide an acceptable splice of the leading and trailing ends of the ply material around the tire building drum 17, it is necessary that the leading edge and trailing edge be accurately aligned with respect to one another. During the typical manufacturing process, it is quite possible that the angle of the cords of the leading edge of the ply material may vary substantially from the angle of the cords of the trailing edge of the material. During manual fabrication of the tire, the tire assembly machine operator manually stretches the ply material in order to achieve an alignment of the leading and trailing edges of the ply material. However, in an automatic stabilizer ply applicator as disclosed herein, it is necessary to mechanically adjust for any variances in the cord angle of the ply material 12.

Figure 18:
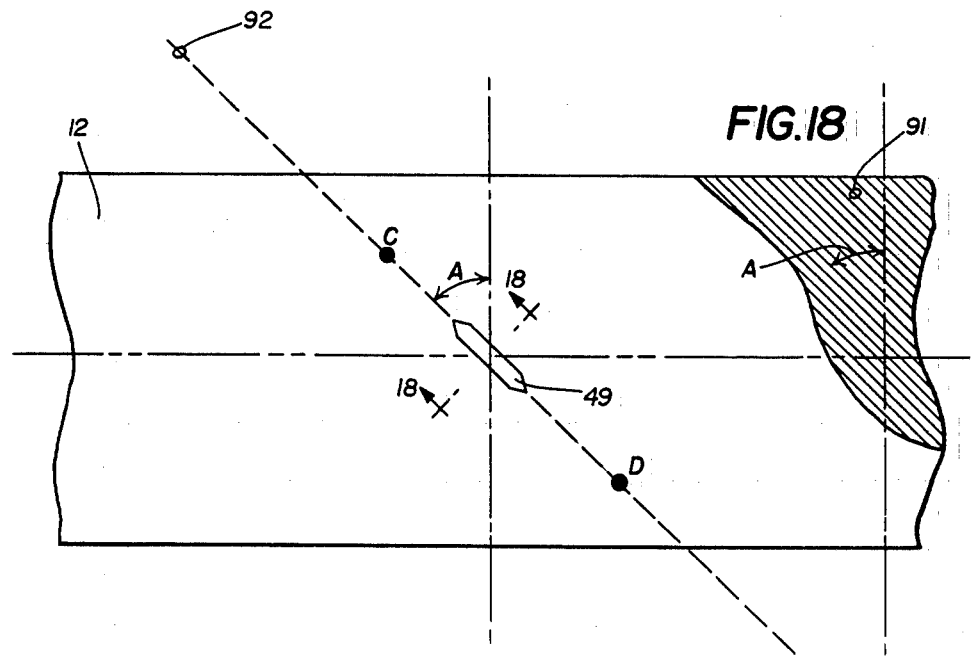
FIG. 18 is a schematic plan view of the stabilizer ply material disclosing the relationship thereof with respect to the cutting means.

Referring now to FIG. 18 of the drawings, there is disclosed a portion of the ply material 12 showing the cords 91 disposed at an angle A with respect to the longitudinal axis of the ply material 12. In the exemplary embodiment, the angle of the cords A is 73°. However, it should be appreciated that this angle may be varied for different types of tire construction. Schematically shown over the central longitudinal axis of the ply material 12 is knife 49. The knife 49 is adapted to traverse the ply material 12 generally along the theoretical cut line 92. The theoretical cut line 92 is disposed at the angle A with respect to the longitudinal axis of the ply material 12.

If the cords were all at the theoretical angular value A, it would be unnecessary to provide any angle correction of the ply material since all of the cuts made in the ply material would have the same angle. However, in practice the cord angle can vary substantially from one end of a piece of ply material to the other.

As discussed above, during a typical cutting operation of the ply material 12, the knife 49 is displaced to the center of the ply material 12 and caused to plunge through the ply material 12 between adjacent cords 91 within the ply material 12. The knife is then caused to be displaced through the ply material to the forward position past the edge of the ply material, thereby causing the ply material to be partially cut. The knife 49 is then raised clear of the ply material 12 and again transported to the center of the ply material 12 and again caused to plunge through the ply material 12 and subsequently the knife is transported through the ply material 12 to the home position thereby causing a complete severing of the leading edge of the ply material 12 from the trailing edge thereof.

During the cutting process, the angle of the cut is measured by the knife assembly 46. Specifically, at a specified distance from the center of the ply material 12 at a point designated C, the output of the rotary encoder 79 is read and stored for later processing by the computer control. It may be readily appreciated by one skilled in the art that the output of the rotary encoder 79 is a function of the angular displacement of the knife 49 due to the coupled relationship between the input shaft 80 of the rotary encoder 79 and the pivoting link 75 and its associated pivoting relationship with respect to knife link 78. It may also be readily appreciated that the output of the rotary encoder 79 may be associated with a given deviation from the theoretical cut line 92 based on the geometry of the linkage mechanism 75 and 78. Similarly, the output of the rotary encoder is measured at point D, which is disposed an equal distance from the central axis of the ply material towards the home position. The output at points C and D of the rotary encoder 79 is utilized in a manner described below to determine the angle of the cut made by the knife 49 in the ply material 12.

Referring now to FIGS. 19 through 22 of the drawings, there is shown a sequence of successive cutting operations of the ply material 12 and the associated calculation of the appropriate angle and length correction.

Figure 19:
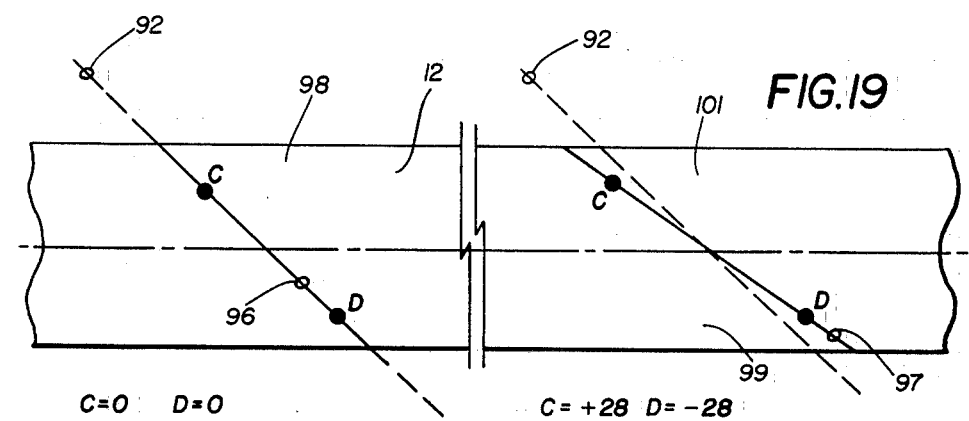
FIGS. 19 through 22 are schematic plan views of the ply material showing the manner in which corrections are made during the application process.

Referring now specifically to FIG. 19 of the drawings there is disclosed a schematic representation of the cutting of a piece of ply material 12 from the continuous roll of such ply material in order to apply said piece to the tire building drum 17. As discussed above, the cutting of the ply material 12 is between belt cords 91 disposed within the ply material 12 at an angle thereto and that such belt cords may vary in their angle with respect to the longitudinal axis of the ply material 12.

As shown in FIG. 19 of the drawings, the ply material 12 has been cut along the actual cut line 96 which in this example is coincident with the theoretical cut line 92 which corresponds to the nominal angle of the belt cords 91 with respect to the longitudinal axis of the ply material 12. During the severing process of the ply material 12 the deviation of the knife from the theoretical cut line is measured at two points designated C and D in FIG. 19. These two points are located an equal distance from the longitudinal axis of the ply material 12. Since the actual cut line 96 is coincident with the theoretical cut line 96 the deviation at point C is equal to 0 and the deviation at point D is equal to 0. The angle correction is calculated from a subtraction of the signed value of the deviation produced at point D from the sign value of the deviation at point C. In the instant example, the deviations are 0 and hence the angle correction is also 0 indicating that no angle correction is necessary for edge 98. The angle data address is calculated by multiplying the angle correction factor discussed above times a constant K−1 which is equal to the number of pulses required to produce a one degree of movement of the manifold at a 73 degree angle. In the exemplary embodiment, K−1=2.0178. Since the angle correction factor AC is 0, the angle data address AD also is 0. The position address in the instant case corresponds to the home position of the manifold 42 which in the instant example corresponds to 735 pulses. The length correction data is measured as the deviation at the center of the ply material 12 from the theoretical cut line 92 during the second plunge of the knife into the material. The second cut 97 is made to separate the portion of ply material 12 from the continuous roll of such material. As may be readily observed, the cut 97 deviates from the theoretical cut line 92. Specifically there is a deviation of +28 at point C and a deviation of −28 at point D. Accordingly, the angle correction factor is calculated by subtracting the sign value of the deviation at point D from the sign value of the deviation at point C in order to arrive at an angle correction (AC) of 56. Similarly the angle data address is calculated using the angle correction and the constant K31 1 to produce an angle data address of 113. The position address is determined by adding the previous address plus the angle data address to yield a position address of 848. The length correct again is measured as the deviation of the knife at the center of the ply material from the theoretical cut line 92 during the second plunge of the knife into the material.

In operation, the manifold 42 is initially at the home position corresponding to an output of 735 pulses. This position corresponds to the position address determined as a result of the deviations produced by the actual cut line 96 and the manifold is caused to pick up edge 98 of the ply material 12 and apply said edge to the building drum 17. The position of the manifold 42 is then corrected by adding the angle data address to the previous position address to yield a new position address of 848. The manifold assumes this new address and picks up the stock from the table and then angle corrects by subtracting the angle data address determined with respect to cut line 97 from the calculated position address to yield an address of 735 which will cause the edge 98 to match the edge 99 of the ply material 12. The position address 848 is then stored for use during application of leading edge 101 as discussed below.

Figure 20:
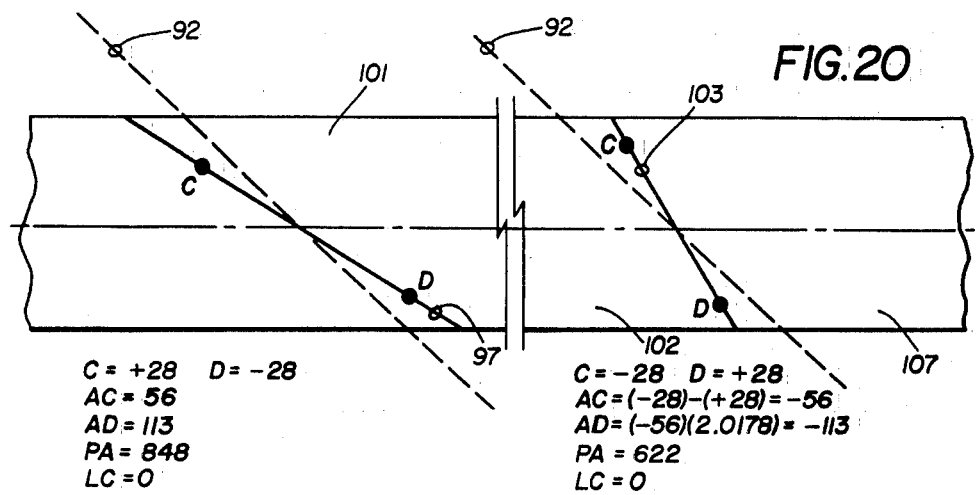

Referring now to FIG. 20 of the drawing there is a representation of the cutting of the subsequent piece of ply material severed from the continuous roll thereof. The cut 97 disclosed in FIG. 19 produces both the trailing edge 99 of the previous piece of ply material severed from the roll thereof and the leading edge of the subsequent piece of ply material to be severed from the roll. Accordingly, as may be readily observed the deviation for the leading edge 101 and hence the angle correction factors are identical for both the trailing edge 99 and the leading edge 101 of the subsequent piece of ply material.

The next actual cut line 103 corresponds to the cut line produced to sever the ply material from the continuous roll and deviated a −28 at point C and a +28 at point D. The angle correction factor is then determined to be −56 and the angle data address is determined to be −113.

During the application of the leading end 101 to the tire building drum 17, the manifold 42 was caused to be rotated 113 pulses as determined by the angle data address calculated for actual cut line 97. The manifold was accordingly moved this amount to position address 848 and caused to apply the leading edge of the ply material 12 to the tire building drum 17. The trailing edge has an angle data address of −113 which will require that the manifold be moved a total of 226 pulses corresponding to a movement of 113 pulses to rotate the manifold to a position corresponding to the theoretical cut line 92 and an additional 113 pulses to move the manifold to a position corresponding to the angle data address of −113. The manifold is then caused to make this movement and pick up the trailing edge 102 of the ply material 12. After the edge 102 has been picked up by the manifold 42, the manifold is caused to rotate to the position of the angular orientation of the leading edge 101 which corresponds to a position address of 848 pulses. The manifold then makes the standard length correction and causes the trailing edge 102 to be applied to the tire building drum 17 where the leading edge 101 is abutted to trailing edge 102.

Figure 21:
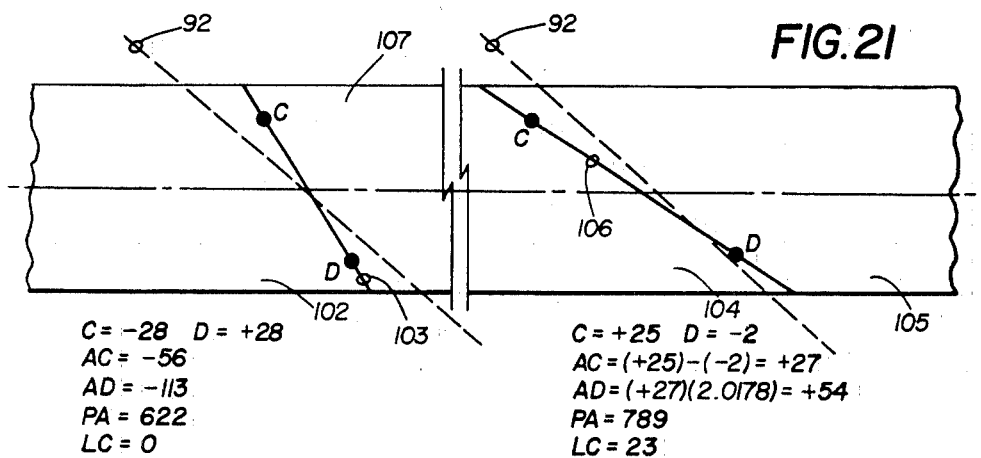

FIG. 21 of the drawings discloses the subsequent cutting operation of the ply material 12. As discussed above, the angle of the preceding trailing edge is identical to the angle of the subsequent leading edge of the ply material 12. Hence, the calculation for all correction factors are identical to those produced for the previous trailing edge. Accordingly, it should be noted that the correction factors associated with the actual cut line 103 are identical for those determined in connection with the actual cut line 103 calculated in FIG. 20. The trailing edge of the ply material 12 is cut along the actual cut line 106 which has a deviation at point C of +25 and a deviation at point D of −2 yielding an actual cut line 106 which does not go through the centerline of ply material 12 and results in an angle correction factor of +27 thereby yielding an angle address of 54 which in turn yields a position address of 789. In addition, there is an additional length correction factor of 23.

In order to apply the leading edge of the ply material 12 to the tire building drum 17, the tire building drum is moved a total of 226 pulses from the position address of 848 which the manifold assumed in the prior application process to the home position corresponding to a position address of 735 pulses and then to the position address of 622 corresponding to the angle data address of −113 calculated for the actual cut line 103. The manifold is then caused to apply the leading edge of the ply material 12 to the tire building drum 17. The material is partially wrapped about the tire building drum 17 and the actual cut line 106 is made and the correction factors associated therewith are calculated. Accordingly, the manifold is caused to be rotated in order to assume a position address of 789 and is caused to pick up the trailing edge 104 of the ply material 12 and subsequently the manifold 42 is caused to rotate to a position address of 622 corresponding to the position address of the manifold when it had applied the leading edge 107 of the ply material 12. In addition, an additional length correction is required due to the fact that the actual cut line does not pass through the centerline of the ply material 12. Accordingly, the length correction factor is added to the standard correction factor for the length correction process and a length correction of the ply material 12 is accordingly made before the trailing edge 104 of the ply material 12 is applied to the tire building drum 17.

Figure 22:
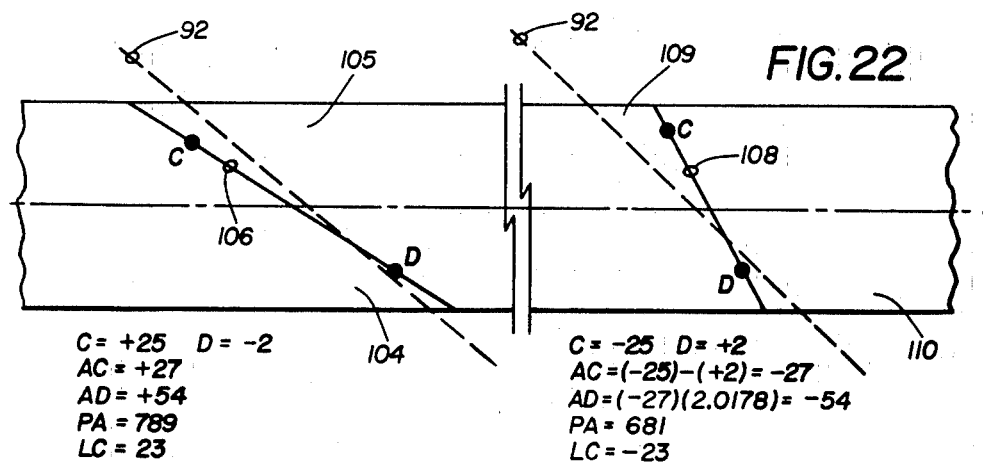

Referring now to FIG. 22 of the drawings, there is a schematic representation of the subsequent severing of a portion of the ply material 12 and the calculation of the factors associated therewith. As previously discussed, the calculation factors for the actual cut line 106 are the same as that discussed above in connection with FIG. 21 of the drawings. The actual cut line 108 is made in the ply material 12 in order to sever it from the continuous roll. The actual cut line 108 has a deviation of −25 at point C and a deviation of +2 at point D producing an angle correction factor of −27 which in turn produces an angle data address of −54 thereby producing a position address of 681. The length correction factor is calculated based on the deviation at the second plunge point to be −23.

During the application of the trailing edge 104, during the application of the previous piece of ply material to the tire building drum, the manifold was caused to assume a position of 622 corresponding to the angular orientation of the leading edge 107 of the ply material 12. The manifold 42 is now caused to assume a position address of 789 corresponding to the angle of the actual cut line 106. A manifold is then caused to pick up the leading edge 105 of the ply material 12 and apply same to a tire building drum wherein the ply material 12 is partially wrapped about the tire building drum 17 in order to partially apply the ply material to the tire building drum. The manifold 42 is then caused to assume a position address of 681 in response to the angle data address determined for actual cut line 108 as −54. The manifold 42 is then caused to pick up the trailing edge 109 and subsequently rotates to a position address corresponding to 789 in order to cause the leading edge 105 and the trailing edge 109 to assume the same angular orientation in order to facilitate the butt alignment thereof. The manifold 42 also makes a length correction with respect to the ply material 12. This length correction factor is added to the standard length correction factor in order to produce a length of material sufficient to produce a butt alignment of the leading edge 105 with the trailing edge 109 as it is applied to the tire building drum 17.

It should be noted that during the application of the ply material 12 to the tire building drum 17, the ply material 12 is always cut slightly shorter than the length of material required to fully wrap around the drum in order that length corrections may be made to the ply material by stretching said ply material in order to cause the final length of the ply material to correspond to the circumference of the tire building drum. In addition, it is necessary to correct for variances in length caused by the cutting process due to a variance between the point where the theoretical cut line 92 crosses the centerline of the ply material 12 and the point where the actual cut line crosses the centerline of the ply material 12. This correction factor is an addition to, or a subtraction from, the standard correction which takes place during all sequences of application of the ply material to the tire building drum.

In the exemplary embodiment it is desired to obtain a butt splice of the leading and trailing edges of the ply material 12 after it has been applied to the tire building drum.

The formal formulas used to determine the correction factors are as follows:

$$\text{Angle Deviation from Theoretical Cut Line (Knife Excursion)} = \frac{C - D}{2}$$

where $D$ = no. of pulses outputted at point $D$
$C$ = no. of pulses outputted at point $C$ $$\text{No. of pulses required to move manifold stepper motor corresponding to 1 pulse of knife excursion} = \left(\frac{1}{Kw}\right)^2$$

-continued $$\text{where } K_W = \left(\frac{B}{D}\right)\left(\frac{E}{L}\right)$$

where  B = inches per pulse on knife excursion
 D = inches per pulse of angle ball nut of manifold
 E = distance from ball nut pivot to manifold pivot
 L = distance from knife plunge to data read point It will be appreciated by one skilled in the art that the formulas for calculation of the correction factors are dependent upon the configuration and the components employed.

Figure 23:
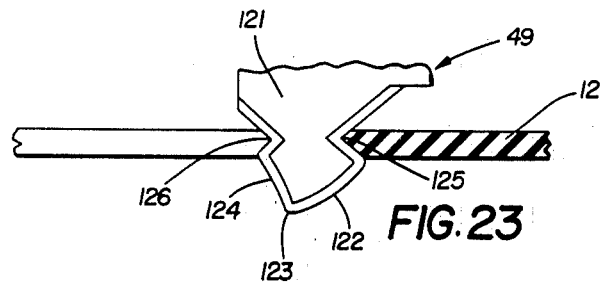
FIG. 23 is a front view of the cutting knife employed by the instant invention showing its relationship with the ply material.

Referring now to FIG. 23 of the drawings there are disclosed further details of construction of the knife 49. The knife 49 is comprised of a body section 121 and a cutting edge designated 122. It should be noted that the knife 49 is particularly adapted to be arcuately plunged in the ply material 12 and employs a point 123 in combination with an arcuate portion of the cutting edge 124 of the cutting edge 122 which is used to penetrate the material upon arcuate plunging of the knife 49 into the ply material 12 by the means shown most clearly in FIGS. 16 and 17 of the drawings. It should be noted that the cutting action caused thereby is not a straight plunge but rather involves a rotation of the penetrating portion of the cutting edge 122 in combination with the general downward movement of the knife 49 to thereby allow easier penetration of the ply material 12 by the knife 49. The knife 49 also employs notches 125 and 126. The notches 125 and 126 have the cutting edge 122 extending on both sides thereof and are located such that the center of each notch is located at the approximate center of the ply material 12 in order that during the cutting of the ply material 12 by the knife 49, the notches 126 and 125 will provide a cutting action utilizing both sides of the notch in order to cause ply material 12 to be generally disposed toward the middle of the notches in order to prevent the tendency of the material to be either pushed upward or downward by the knife 49 during the cutting action.

In operation, the knife 49 is caused to rapidly approach the ply material 12 by the knife assembly 46. As the knife 49 gets closer to the surface of the ply material 12, its rate of approach is decreased. As the knife begins to contact the surface of the ply material, a cutting action is produced by the angular rotation of the knife in combination with the downward movement of the knife. Heat is utilized to soften the ply material in order to facilitate cutting. The reduced speed of the knife as it approaches the ply material causes the ply material to be softened by the heat. The angular movement of the knife causes the point 123 to plunge through the ply material 12 and subsequently cut, by a slicing action of edge 122, the ply material 12. The resistance offered by the cord increases the stiffness of the ply material in proximity to the cord, thus generally causing the pivotable knife 49 to have a tendency to cut between adjacent cords.

Accordingly, the knife of the instant invention is particularly adapted to cut between adjacent cords in a ply material without exposing the surface at the cords therein.

Figure 24:
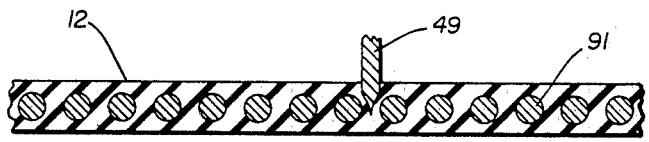
FIG. 24 is a cross sectional view of the ply material taken along the lines 18—18 and showing the cutting means partially embedded therein.

FIG. 24 shows further details of construction of the ply material 12 and its relationship of the belt cords 91 disposed within the ply material 12 and further showing the knife 49 partially plunged through the ply material 12.

Figure 25:
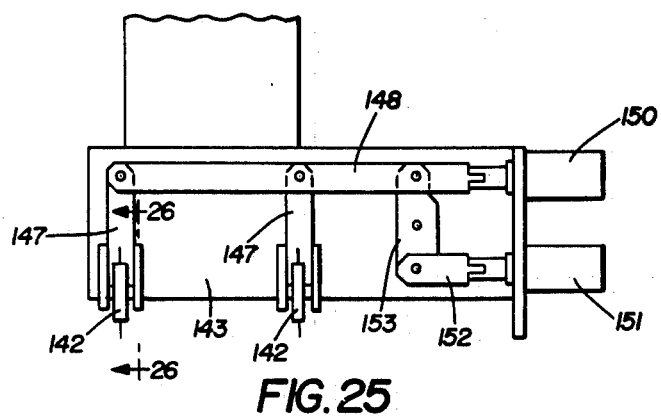
FIG. 25 is a plan view of the guiding means employed by the instant invention.
Figure 26:
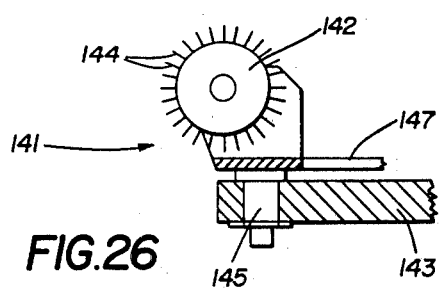
FIG. 26 is a side cross sectional view of the guiding means disclosed in FIG. 25 taken along the lines 25—25.

Referring now to FIGS. 25, 26 and 28 there are shown further details of the centering mechanism 141 employed by the instant invention to maintain the ply material 12 centrally disposed within the ply applicator 16. The centering mechanism 141 is comprised of two drive wheels 142 which have disposed about the periphery thereof a series of pointed projections 144. The guide wheels 142 are mounted on the ply applicator 16 in such a manner that the bottom surface of the ply material 12 is adapted to rest on the pointed projections 144 of the guide wheels 142. It may be appreciated by one skilled in the art that the pointed projections 144 will very slightly penetrate the bottom surface of the ply material 12 such that a functional relationship is established between the ply material 12 and the pointed projections 144. As may be readily appreciated this functional relationship will cause the ply material 12 to be displaced and steered in response to the angular orientation of the guide wheels 142. As shown most clearly in FIG. 26 of the drawings, each of the guide wheels 142 is pivotally mounted to mounting member 143 by a pivot mount 145.

Fixedly attached to each of the pivot mounts 145 are links 147 which have the opposite end thereof pivotally affixed to transverse link 148. It may now be appreciated that lateral movement of the transverse link 148 with respect to the center line of the ply material 12 will cause the guide wheels 142 to be pivoted about pivot mount 145. Due to the functional relationship of the ply material 12 following the angular orientation of the guide wheels 142, it may now be appreciated that as the guide wheels 142 are angularly displaced there will be caused a similar displacement of the ply material 12 with respect to the ply applicator 16 and a tendency of the material to be steered in the same direction.

Transverse movement of the transverse link 148 is effected by selective actuation of solenoids 150 and 151. The output shaft of solenoid 150 is pivotally affixed to one end of the transverse link. The output shaft of the solenoid 151 is pivotally affixed to solenoid link 152, which link has the opposite end thereof pivotally affixed to pivoting link 153. The pivoting link 153 is also pivotally affixed to the transverse link 148 at a position between the pivot connection with respect to solenoid 150 and the pivot connection of the nearest fixed link 147. It may now be appreciated that selective actuation of the solenoids 150 and 151 will cause a rotation of the pivoting link 153 and hence a lateral movement of transverse link 148 causing a rotation of fixed links 147 and their associated guide wheels 142 having exposed on the periphery thereof pointed projections 144 which are oriented by means of solenoids 150 and 151.

It may now be appreciated that there has been disclosed a means for guiding the ply material 12 within the ply applicator 16 in order to cause the ply material 12 to be centered within the ply applicator by means discussed more fully below.

Figure 27:
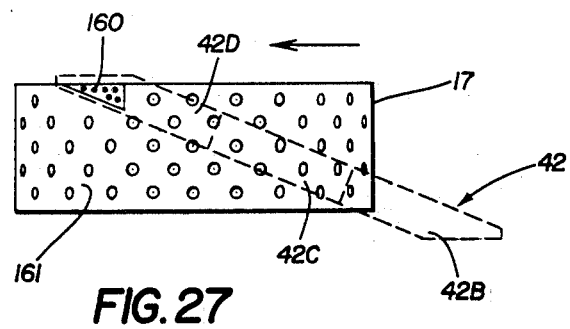
FIG. 27 is a plan view of the tire building drum employed by the instant invention showing the details of construction thereof and its relationship with the manifold employed by the instant invention.

Referring now to FIG. 27 of the drawings, there are shown further details of the tire building drum 17 employed by the instant invention. The tire building drum 17 has two areas for applying vacuum to the surface thereof. The first area is a small triangular-shaped area designated 160 having a plurality of holes within said area in the surface of said tire building drum 17 and connected to a first manifold means adapted to provide a vacuum thereto. The second vacuum area 161 is comprised of the remainder of the surface of the tire building drum 17 and also has a series of orifices in said second vacuum area connected to a second separate manifold means in communication with a second vacuum source.

Shown in phantom disposed over the tire building drum 17 is manifold 42. The manifold 42 is adapted to have the vacuum selectively applied thereto. Specifically, the manifold 42 is comprised of three chambers designated 42B, 42C and 42D, each of which may be selectively provided with either a vacuum or purge air. The selective actuation of the manifold 42 and its separate chambers 42B, 42C and 42D is used in conjunction with the selective application of a vacuum to said first and second vacuum areas of the tire building drum 17.

Specifically, as the leading edge of the ply material 12 is being transported toward the tire building drum 17 by the manifold 42, the ply material 12 is being retained by the manifold 42 by a vacuum applied to the chambers 42B, 42C and 42D of the manifold 42. During this time the vacuum area 160 is positioned to receive the tip of the leading edge of the ply material 12. As the first portion of the leading edge of the ply material 12 is contacted with the tire building drum 17, over the first vacuum area 160, a vacuum is caused to be applied to the first vacuum area 160 and purge air is provided to the chamber 42D of the manifold 42 in order to effect a transfer of the first portion of the leading edge of the ply material 12 from the manifold 42 to the tire building drum 17. As the remainder of the leading edge of the ply material 12 is applied to the tire building drum 17 the second vacuum area 161 is caused to have a vacuum applied thereto and the purge air is provided to the chambers 42C and 42B sequentially as the leading edge of the ply material 12 is applied to the tire building drum 17. It may now be readily appreciated that the selective application of purge air and vacuum to the chambers of the manifold 42 facilitates the transfer of the ply material 12 from the manifold 42 to the tire building drum 17 which uses selective application of a vacuum to specific areas of the tire building drum 17 also to assist in the transfer of the ply material 12 from the manifold 42 to to tire building drum 17.

Figure 29:
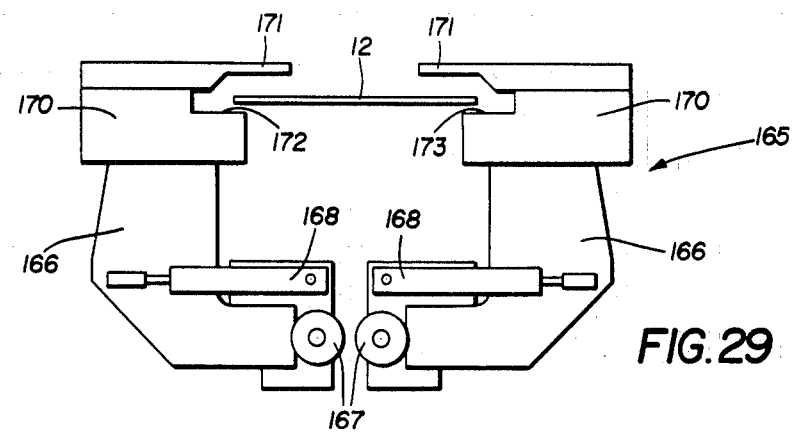
FIG. 29 is a front view of the edge detection means employed by the instant invention shown in its operative position.
Figure 30:
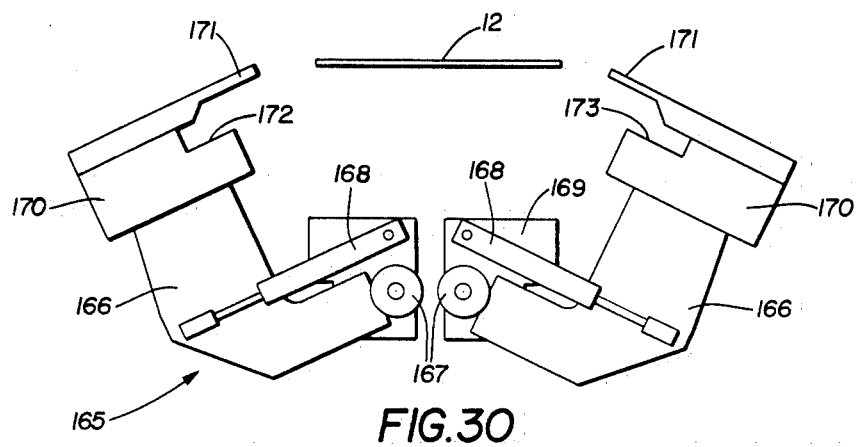
FIG. 30 is a front view of the edge detection means employed by the instant invention shown in its retracted position.

Referring now to FIGS. 28, 29 and 30 of the drawings, there are disclosed the details of construction of the edge detecting means 165 utilized by the ply applicator 16 in order to provide an output signal to centering mechanism 141 in order to maintain the ply material 12 centrally located within the ply applicator 16. The edge detecting means 165 is composed of two mirror image components disposed below and beside the ply material 12 and affixed to mounting means 169.

The edge detecting means is comprised of support arms 166 which are pivotally mounted by pivot mounts 167 in order to pivot with respect to mount 169. The support arms 166 are pivoted by air cylinders 168. Disposed on the upper portion of the support arms 166 are photo detector mounts 170 having photo detectors 172, 173 disposed therein for use in conjunction with reflective surfaces 171 mounted over the photo detectors and adapted to be used in conjunction with the photo detectors mounted in the photo detector mount 170 in order to detect the presence of an object disposed between the photo detectors 172 and 173 and the reflective surface 171.

In operation, the edge detecting means 165 has support arms 166 pivoted into position in order that the edges of the ply material 12 are disposed between the photo detector mount 170 and the reflective surfaces 171. As the ply material 12 is passed by the edge detecting means 165, the photo detectors are utilized to sense the position of the edge of the ply material 12. The output of the edge detecting means 165 is provided to centering mechanism 141 in order to cause the ply material 12 to be centrally located within the ply applicator 16. In the exemplary embodiment only one edge is detected.

It may thus be seen that there has been disclosed a means for applying an elastomeric material having cord members disposed therein to a tire building drum. The leading edge of the material is cut along the axis of the cords between two adjacent cord members by means of a knife member which may follow the angular orientation of the cords. The angular orientation of the knife during the cutting process is measured in order to produce an output indicative of the angle of cut of the elastomeric material. A manifold is then employed to place the leading edge of the elastomeric material on a tire building drum having two separate vacuum means associated therewith in order to facilitate the transfer from the manifold having a plurality of chambers therein to the tire building drum. The trailing edge of the elastomeric material is then cut by the knife means and the angle of the trailing end cut is also recorded. It should be noted that the knife means employed to cut the elastomeric material has a configuration adapted to cause a minimum of distortion of the elastomeric material during the cutting process and further to allow the plunging of the knife into the elastomeric material between two cords disposed therein. As the material is being applied to the tire building drum, the ply material is guided by a pair of pointed wheels which are rotated in response to a pair of photo detector means pivotally mounted in order to allow the photo detector means to be pivoted out of the way during that portion of the cycle during which the manifold is passing over the photo detector means. The trailing end of the ply material is then picked up by the manifold, and the angular orientation of the trailing edge of the ply material is changed to match that of the leading edge of the ply material in order to assure a good splice of the two ends of the ply material. In addition, the length of the material is corrected in order to make sure that the two ends of the ply material will abutt each other when applied to the tire building drum. The tire building drum is then rotated and the manifold is caused to track towards the tire building drum in order to apply the trailing end of the ply material to the tire building drum.

It will be apparent to those skilled in the art that various modifications and additions may be made in the instant invention without departing from the essential features thereof, which are intended to be defined and secured by the appended claims.

What is claimed is:

1. A cutting means adapted to sever a planar material comprising:
   a. a planar metallic body portion adapted to be pivotally mounted wherein said planar metallic body portion pivots about a pivot point;
   b. point means affixed to said body portion generally opposite said pivot point;
   c. curvilinear knife edge means affixed to said body portion proximate to said point means;
   d. notch means associated with said body portion and located proximate to said edge means, wherein said notch means is adapted to cut said planar material upon displacement of the body portion parallel to said planar material; and e. displacement means associated with said planar metallic body portion for rotating said body portion about said pivot means in order to impart a rotation to said curvilinear knife edge means while simultaneously causing said curvilinear knife edge means to be displaced towards said planar material, wherein said notch means are adapted to engage said planar material after the planar metallic body portion has fully penetrated said planar material and is caused to cut said planar material when said body portion is displaced parallel to said planar material.

2. The apparatus of claim 1 wherein said edge means has said point means associated with one end thereof and said notch means associated with the other end thereof.

3. The apparatus of claim 1 wherein said notch means has at least one cutting edge associated therewith.

4. The apparatus of claim 3 wherein said cutting means further comprises a heating means adapted to heat said curvilinear knife edge means.

5. In a cutting means adapted to cut a planar material by plunging said cutting means into said planar material and being displaced therein to effect a cutting of said planar material, the improvement comprising:

displacement means associated with said cutting means for rotating said cutting means about a pivot in order to impart a rotation to said cutting means while simultaneously causing said cutting means to be displaced towards said planar material wherein a notch means is caused to engage said planar material after said cutting means has penetrated said planar material in order to cause a cutting edge associated with said notch means to cut said planar material upon displacement of said cutting means parallel to said planar material.

6. The improvement of claim 5 further comprising a plurality of notch means.

7. The improvement of claim 5 further comprising means for heating said cutting means.

* * * * *

UNITED STATES PATENT AND TRADEMARK OFFICE
CERTIFICATE OF CORRECTION

PATENT NO. : 4,572,046
DATED : February 25, 1986
INVENTOR(S) : Donald O. Still, Hubert T. Hovance & George J. Burley It is certified that error appears in the above-identified patent and that said Letters Patent are hereby corrected as shown below:

Column 12, line 10, "encoder 70" should read --encoder 79 --;

Column 14, line 16, should read "constant K31 1" should read -- constant K-1--

Signed and Sealed this

Twentieth Day of May 1986

[SEAL]

Attest:

DONALD J. QUIGG

Attesting Officer

Commissioner of Patents and Trademarks